United States Patent
Sugiura et al.

(10) Patent No.: US 9,027,161 B2
(45) Date of Patent: *May 5, 2015

(54) SYSTEM, METHOD, AND COMPUTER-READABLE RECORDING MEDIUM FOR SUPPORTING LICENSE ACQUIREMENT

(71) Applicant: Ricoh Company, Ltd., Tokyo (JP)

(72) Inventors: Yuuko Sugiura, Tokyo (JP); Tomoya Hirokawa, Kanagawa (JP); Taku Nagumo, Kanagawa (JP); Taku Ikawa, Kanagawa (JP)

(73) Assignee: Ricoh Company, Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/183,798

(22) Filed: Feb. 19, 2014

(65) Prior Publication Data

US 2014/0173762 A1    Jun. 19, 2014

Related U.S. Application Data

(63) Continuation of application No. 12/876,330, filed on Sep. 7, 2010, now Pat. No. 8,701,208.

(30) Foreign Application Priority Data

Sep. 11, 2009   (JP) ................ 2009-210980

(51) Int. Cl.
*G09F 21/10* (2006.01)
*G06F 21/10* (2013.01)
(Continued)

(52) U.S. Cl.
CPC ............. *G06F 21/10* (2013.01); *G06Q 30/00* (2013.01); *G06F 21/105* (2013.01);
(Continued)

(58) Field of Classification Search
USPC ................ 726/1, 26–33; 705/50–59
See application file for complete search history.

(56) References Cited

U.S. PATENT DOCUMENTS

| 5,579,222 A | 11/1996 | Bains et al. |
| 2002/0108049 A1 | 8/2002 | Xu et al. |

(Continued)

FOREIGN PATENT DOCUMENTS

| JP | 2000-339156 | 12/2000 |
| JP | 2005-332137 | 12/2005 |

(Continued)

OTHER PUBLICATIONS

Ferrante, Daniel. "Software Licensing Models: What's Out There?." IT Professional 8.6 (2006): 24-29. Publisher: IEEE Computer Society.*

(Continued)

*Primary Examiner* — Madhuri Herzog

(74) *Attorney, Agent, or Firm* — IPUSA, PLLC

(57) ABSTRACT

A system including a computer and having a part that stores identification data and status data in association with the identification data, a part that receives a request to acquire a license corresponding to a designated identification data, a part that receives a designation of an electronic device, a part that designates the identification data, obtains license data corresponding to the designated identification data, and updates the status data associated with the designated identification data, the updated status data indicating that the license is being used, a part that transmits the license data to the electronic device via a network and instructs the electronic device to acquire the license, and a part that provides a part that receives an instruction for re-executing obtaining of the license data depending on whether the status data is updated and instructs to re-execute the obtaining of the license data.

9 Claims, 20 Drawing Sheets

(51) Int. Cl.
*G06Q 30/00* (2012.01)
*H04L 29/06* (2006.01)

(52) U.S. Cl.
CPC ....... *G06Q 2220/10* (2013.01); *G06Q 2220/18* (2013.01); *H04L 2209/603* (2013.01); *H04L 2463/101* (2013.01); *H04L 2463/103* (2013.01); *H04L 63/10* (2013.01)

(56) References Cited

U.S. PATENT DOCUMENTS

| | | |
|---|---|---|
| 2004/0139315 A1* | 7/2004 | Tokutani et al. ............. 713/156 |
| 2005/0262546 A1 | 11/2005 | Murase et al. |
| 2006/0020553 A1* | 1/2006 | Septon ............................ 705/59 |
| 2006/0020555 A1* | 1/2006 | Septon ............................ 705/59 |
| 2006/0021068 A1* | 1/2006 | Xu et al. ......................... 726/30 |
| 2006/0031170 A1* | 2/2006 | Septon ............................ 705/59 |
| 2006/0031831 A1 | 2/2006 | Templin et al. |
| 2006/0122941 A1 | 6/2006 | Coley et al. |
| 2007/0079121 A1 | 4/2007 | Sekiguchi et al. |
| 2008/0155543 A1 | 6/2008 | Uchida |
| 2008/0209569 A1 | 8/2008 | Araki |
| 2009/0138403 A1 | 5/2009 | Lee et al. |
| 2009/0199280 A1 | 8/2009 | Muto |
| 2010/0058482 A1 | 3/2010 | Nagumo et al. |
| 2010/0071069 A1 | 3/2010 | Sugiura et al. |

FOREIGN PATENT DOCUMENTS

| | | |
|---|---|---|
| JP | 2008-158669 | 7/2008 |
| JP | 2008-204317 | 9/2008 |
| JP | 2008-243179 | 10/2008 |
| JP | 2010-072875 | 4/2010 |

OTHER PUBLICATIONS

Extended European Search Report dated Feb. 14, 2011.
Japanese Office Action dated Jul. 30, 2013.
Statement in accordance with the Notice from the European Patent Office dated Oct. 1, 2007 concerning business methods—XP002456252.
Licensing Digital Content With a Generic Ontology: Escaping From the Jungle of Rights Expression Languages by Nadah et al; Publisher: ACM; Year: 2007.
Japanese Office Action dated Feb. 10, 2015.

* cited by examiner

FIG.3

| PRODUCT ID |
| --- |
| VERSION |
| NAME |
| DESCRIPTION |
| VENDOR NAME |
| : |

FIG.4

| PRODUCT ID |
| --- |
| VERSION |
| NAME |
| DESCRIPTION |
| VENDOR NAME |
| : |

FIG.9

| MANAGEMENT NO. | PRODUCT KEY | PRODUCT ID | DEVICE NO. | STATUS | LICENSE TYPE | LICENSE VALIDITY PERIOD | LICENSE VALIDITY DATE | LICENSE ISSUE DATE |
|---|---|---|---|---|---|---|---|---|
| 1 | KEY001 | PROxxx001 | K00001 | CHECK OUT | TIME LIMITED LICENSE (PERIOD DESIGNATED) | 1 YEAR | | |
| 2 | KEY001 | PROxxx001 | K00002 | CHECK OUT | TIME LIMITED LICENSE (PERIOD DESIGNATED) | 1 YEAR | | |
| 3 | KEY001 | PROxxx001 | | CHECK IN | TIME LIMITED LICENSE (PERIOD DESIGNATED) | 1 YEAR | | |
| 4 | KEY002 | PROxxx002 | K00003 | CHECK OUT | | | | |
| 5 | KEY002 | PROxxx003 | K00003 | CHECK OUT | | | | |
| 6 | KEY003 | PROxxx004 | K00004 | CHECK OUT | | | | |

| PRODUCT ID | VERSION | PRODUCT ID OF FUNCTION PACKAGE | ACTIVATION FLAG | LICENSE VALIDITY DATE |
|---|---|---|---|---|
| ... | ... | ......... | COMPLETE | 2009.1.30 |
| ... | ... | ......... | UNCOMPLETE | INDEFINITE |
| .. | .. | .. | .. | .. |

| IP ADDRESS | DEVICE NO. | DEVICE DATA | VALIDITY INSPECTION RESULT | PROCESS STATUS |
|---|---|---|---|---|
| ... | ... | ... | | DEVICE DATA OBTAINING COMPLETE |
| ... | ... | ... | | DEVICE DATA OBTAINING COMPLETE |
| ... | ... | ... | | DEVICE DATA OBTAINING COMPLETE |
| ... | ... | ... | | ... |

| PRODUCT ID (FUNCTION PACKAGE) | PRODUCT ID OF DEPENDING FUNCTION PACKAGE OR FIRMWARE |
|---|---|
| 21111111 | 0 |
| 21111112 | 21111111 |
| 21111113 | 0 |
| 21111114 | 21111111 |
| .. | .. |

FIG.15

| PRODUCT ID | VERSION | PRODUCT ID OF FUNCTION PACKAGE | |
|---|---|---|---|
| ⋮ | ⋮ | ⋮ | ⋮ |
| ⋮ | ⋮ | | ⋮ |
| ⋮ | ⋮ | | ⋮ |

64

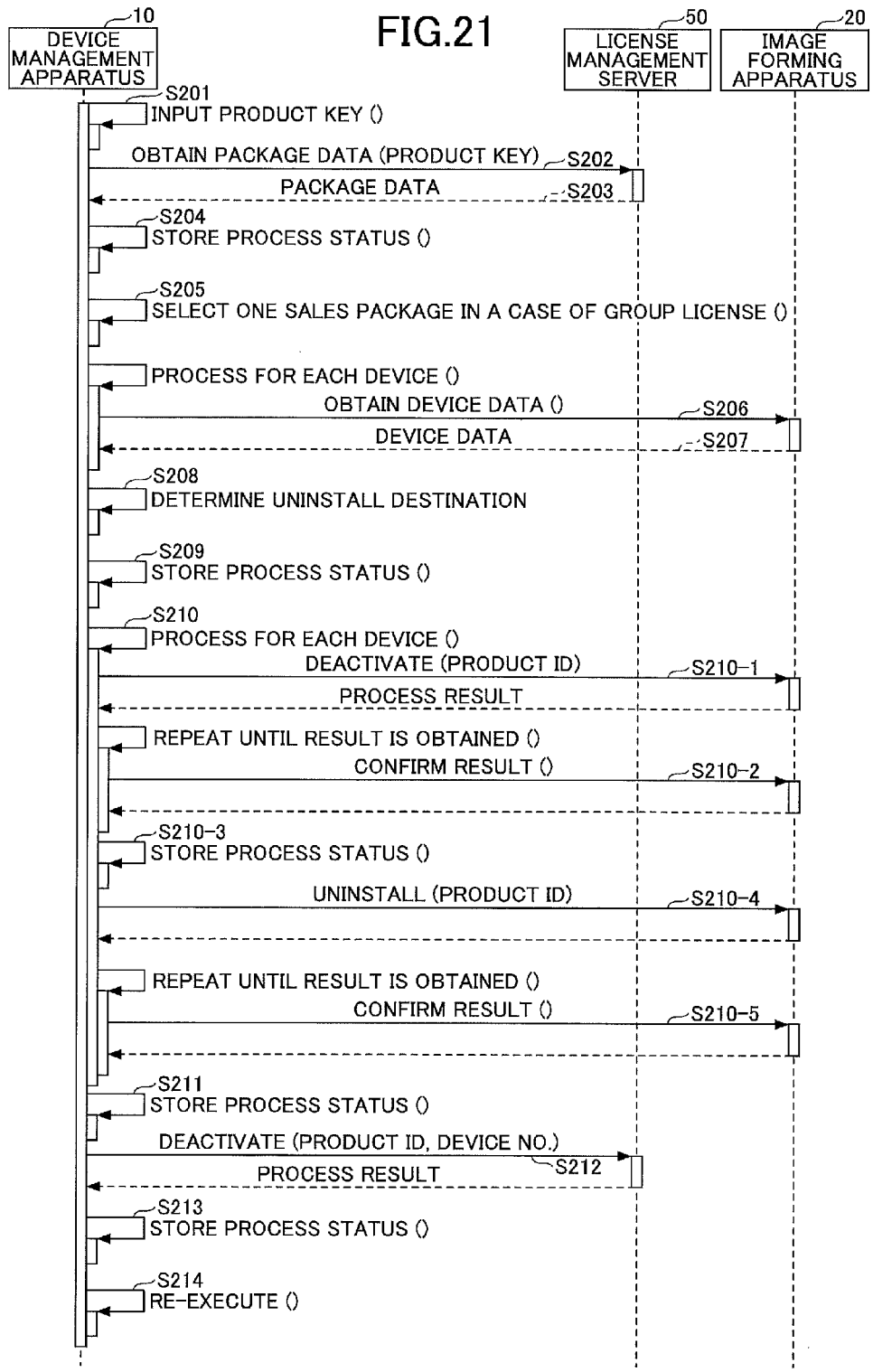

SYSTEM, METHOD, AND COMPUTER-READABLE RECORDING MEDIUM FOR SUPPORTING LICENSE ACQUIREMENT

CROSS-REFERENCE TO RELATED APPLICATIONS

This application is a Continuation application of the U.S. patent application Ser. No. 12/876,330 filed on Sep. 7, 2010, and is based upon and claims the benefit of priority of the prior Japanese Patent Application No. 2009-210980 filed on Sep. 11, 2009, in the Japanese Patent Office, the entire contents of which are incorporated herein by reference.

BACKGROUND OF THE INVENTION

1. Field of the Invention

The present invention relates to a system, a method, and a computer-readable recording medium for license acquirement support, and more particularly, to a system, a method, and a computer-readable recording medium for supporting acquirement of a license of a program of an electronic device.

2. Description of the Related Art

With recent image forming apparatuses called multi-function machines, new applications can be developed and installed into the image forming apparatuses even after the image forming apparatuses have been shipped. It would be convenient for the user if the license of the application could be provided separately with the entity of the application according to the type of usage of the user. Moreover, providing the license separately could also be a chance for expansion for those selling the application.

However, acquiring licenses for each image forming apparatus can be extremely complicated in a user environment where many image forming apparatuses are used. Accordingly, Japanese Laid-Open Patent Publication No. 2008-243179 discloses a license obtaining apparatus that uniformly performs the tasks of obtaining licenses of applications for plural image forming apparatuses.

However, by having the license obtaining apparatus interposed between a license server (origin issuing the license) and an image forming apparatus (image forming apparatus for executing an application of the license), there is a high possibility of inconsistency between the status of the licenses managed by the license server and the status of the licenses acquired by the image forming apparatus. There may be a case where the license obtaining apparatus fails to distribute a license to the image forming apparatus (acquiring of license) even in a case where the license is successfully issued from the license server to the license obtaining apparatus. In this case, the license server recognizes that a license is already issued even though the image forming apparatus has not actually acquired the license. Therefore, even if re-issuing of the license is requested to the license server, the request would be denied because the license is already issued. As a result, the application cannot be used in the image forming apparatus.

SUMMARY OF THE INVENTION

The present invention may provide an apparatus, a method, and a computer-readable recording medium for license acquirement support that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an apparatus, a method, and a computer-readable recording medium for license acquirement support particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a device management apparatus being connected to a license management apparatus via a network, the license management apparatus storing license status data in association with license identifiers, the device management apparatus including: a request receiving part configured to receive a request to acquire a license corresponding to a designated license identifier; a designation receiving part configured to receive a designation of at least one electronic device for acquiring the license; an obtaining part configured to obtain a license file corresponding to the designated license identifier from the license management apparatus, update the license status data corresponding to the designated license identifier, and record the license file to a process status storage part in association with the electronic device, the updated license status data indicating that the license is being used; an acquirement executing part configured to execute an acquirement operation including the processes of transmitting the obtained license file to the electronic device via the network, instructing the electronic device to acquire the license, and recording a license acquirement result to the process status storage part in association with the electronic device; and a re-execution part configured to execute an acquirement re-execution operation in a case where the acquiring of the license by the electronic device is determined as a failure according to the license acquirement result, the acquirement re-execution operation including the processes of displaying the failure of the acquirement on a screen and re-executing the acquirement operation with respect to the license file based on data input to the screen.

Another embodiment of the present invention provides a method for supporting acquirement of a license of a program of an electronic device by using a computer connected to a license management apparatus via a network, the license management apparatus storing license status data in association with license identifiers, the method including the steps of: a) receiving a request to acquire a license corresponding to a designated license identifier; b) receiving a designation of at least one electronic device for acquiring the license; c) obtaining a license file corresponding to the designated license identifier from the license management apparatus; d) updating the license status data corresponding to the designated license identifier, the updated license status data indicating that the license is being used; e) recording the license file to a process status storage part in association with the electronic device; f) executing an acquirement operation including the processes of transmitting the obtained license file to the electronic device via the network, instructing the electronic device to acquire the license, and recording a license acquirement result to the process status storage part in association with the electronic device; and g) executing a re-execution operation in a case where the acquiring of the license by the electronic device is determined as a failure according to the license acquirement result, the acquirement re-execution operation including the processes of displaying the failure of the acquirement on the screen and re-executing the acquirement operation with respect to the license file based on data input to the screen.

Another embodiment of the present invention provides a computer-readable recording medium on which a program is recorded for causing a computer to execute a license acquirement support method for supporting acquirement of a license of a program of an electronic device, the computer being connected to a license management apparatus via a network, the license management apparatus storing license status data in association with license identifiers, the license acquirement support method including the steps of: a) receiving a request to acquire a license corresponding to a designated license identifier; b) receiving a designation of at least one electronic device for acquiring the license; c) obtaining a license file corresponding to the designated license identifier from the license management apparatus; d) updating the license status data corresponding to the designated license identifier, the updated license status data indicating that the license is being used; e) recording the license file to a process status storage part in association with the electronic device; f) executing an acquirement operation including the processes of transmitting the obtained license file to the electronic device via the network, instructing the electronic device to acquire the license, and recording a license acquirement result to the process status storage part in association with the electronic device; and g) executing a re-execution operation in a case where the acquiring of the license by the electronic device is determined as a failure according to the license acquirement result, the acquirement re-execution operation including the processes of displaying the failure of the acquirement on the screen and re-executing the acquirement operation with respect to the license file based on data input to the screen.

Other objects, features and advantages of the present invention will become more apparent from the following detailed description when read in conjunction with the accompanying drawings.

BRIEF DESCRIPTION OF THE DRAWINGS

FIG. 3 is a schematic diagram illustrating an exemplary configuration of the sales package data;

FIG. 4 is a schematic diagram illustrating an exemplary configuration of the function package data;

FIG. 9 illustrates an example of a license management table according to an embodiment of the present invention;

FIG. 11 illustrates an example of an install data management table according to an embodiment of the present invention;

FIG. 13 is a schematic diagram illustrating an example of a device management table according to an embodiment of the present invention;

FIG. 15 is a schematic diagram illustrating an example of a package management table according to an embodiment of the present invention;

FIG. 21 is a sequence diagram for describing uninstalling and deactivating a sales package according to an embodiment of the present invention.

DETAILED DESCRIPTION OF THE PREFERRED EMBODIMENTS

Figure 1:
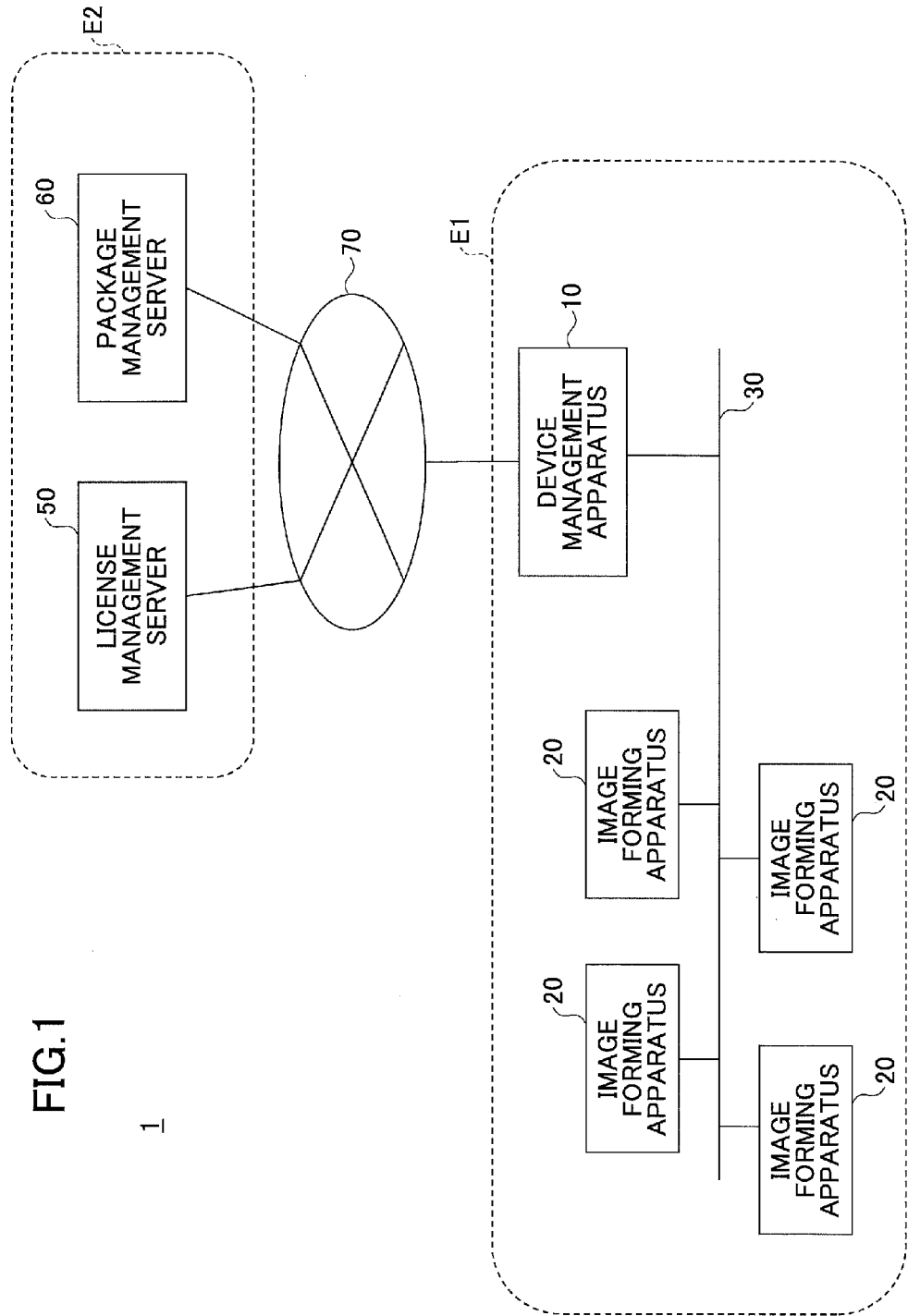
FIG. 1 is a schematic diagram illustrating an example of a device management system according to an embodiment of the present invention.

Embodiments of the present invention are described below with reference to the drawings. FIG. 1 is a schematic diagram illustrating an example of a device management system according to an embodiment of the present invention. A user environment E1 in the device management system 1 is a system environment of a user (customer) of an image forming apparatus 20. For example, the user environment E1 may correspond to a company or an office of the user of the image forming apparatus 20. In the user environment E1, one or more image forming apparatuses 20 and device management apparatuses are connected to each other via a network (e.g., wired network, wireless network) 30 such as a LAN (Local Area Network). The image forming apparatus 20 in this embodiment is a multifunction machine that achieves plural functions (e.g., printing, scanning, copying, fax transmission/reception) inside a single housing. The image forming apparatus 20 is one example of an electronic device. The image forming apparatus 20 does not need to be a multifunction machine. The image forming apparatus 20 may be, for example, a printer or a scanner having a single function. The image forming apparatus 20 can conduct function expansion or the like any time by adding or updating program component(s) (hereinafter also simply referred to as "component(s)").

The device management apparatus 10 is a computer (e.g., PC (Personal Computer)) that uniformly obtains components operating in the image forming apparatuses 20 in the user environment E1 and acquires licenses (authority to use) of the components. The device management apparatus 10 is one example of the license acquirement support apparatus. Plural user environments E1 may be provided in correspondence with the number of users (number of users in company units or office units).

On the other hand, a manufacturer environment E2 in the device management system 1 is a system environment of a seller (selling side) of a component to be added to the image forming apparatus 20. For example, the manufacturer environment E2 may be operated by a manufacturer of the image forming apparatus 20. The manufacturer environment E2 in this embodiment includes, for example, a license management server 50 and a package management server 60.

The user environment E1 and the manufacturer environment E2 are connected via a network 70 (e.g., the Internet).

The component in this embodiment is circulated (distributed) in units referred to as "sales package". Further, in this embodiment, plural groups of sales packages may circulate units of sets. These plural groups of sales packages may also be simply referred to as "group" in this embodiment.

Figure 2:
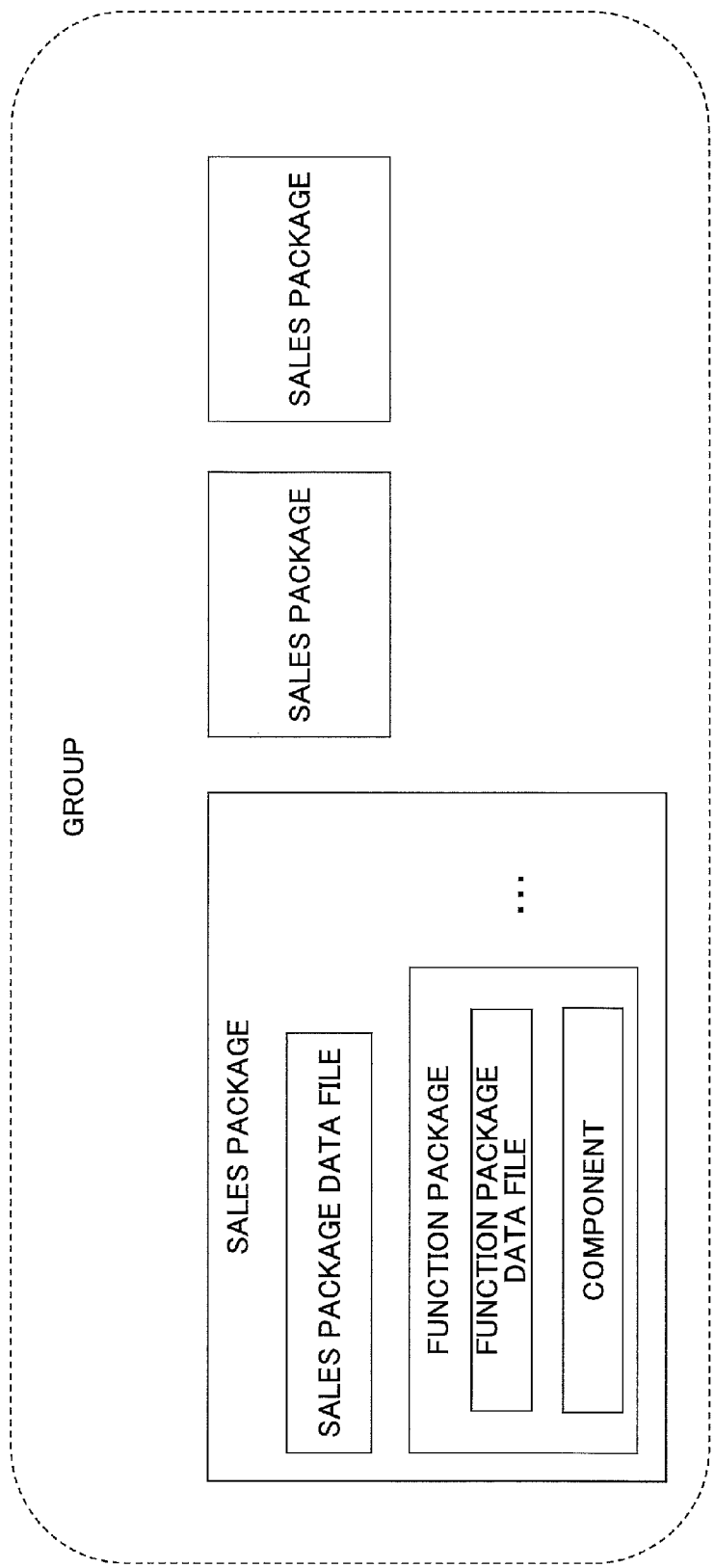
FIG. 2 is a schematic diagram illustrating exemplary configurations of sales packages.

FIG. 2 is a schematic diagram illustrating exemplary configurations of sales packages. As illustrated in FIG. 2, a single sales package is an archive file including a single sales package data file and one or more function packages.

The sales package data file is a file in which attribute data of the sales package (sales package data) is recorded.

FIG. 3 is a schematic diagram illustrating an exemplary configuration of the sales package data. In FIG. 3, the sale package data includes data indicating, for example, a product ID, a product version (version), a product name (name), a product description (description), and a vendor name.

The "product ID" indicates an identifier (product identifier) that is uniquely assigned to each sales package and each function package. The "version" indicates the version number of the sales package. The "name" indicates the name of the sales package. The "description" indicates a description pertaining to the sales package. The "vendor name" indicates the name of the vendor (developer) of the sales package.

Returning to FIG. 2, the function package is software transformed into a package in function units (software package). A single function package is an archive file including a single function package data file and a single component entity (e.g., JAR (Java (Registered Trademark) Archive) file).

The function package data file is a file in which attribute data of the function package (function package data) is recorded.

FIG. 4 is a schematic diagram illustrating an exemplary configuration of the function package data. In FIG. 4, the function package data includes data of, for example, a product ID, a product version (version), a product name (name), a product description (description), a vendor name, and package dependency data (not illustrated).

For example, the "product ID" is data indicating a product ID assigned to the function package. The "version" is data indicating a version number of the function package. The "name" is data indicating the name of the function package. The "description" is data indicating a description pertaining to the function package. The "vendor name" is data indicating the name of a vendor (developer) of the function package.

In the example illustrated in FIG. 2, a single group has a configuration including 3 sales packages. Even in a case of a sales package belonging to a group, the sales package can be distributed (circulated) independently.

Figure 5:
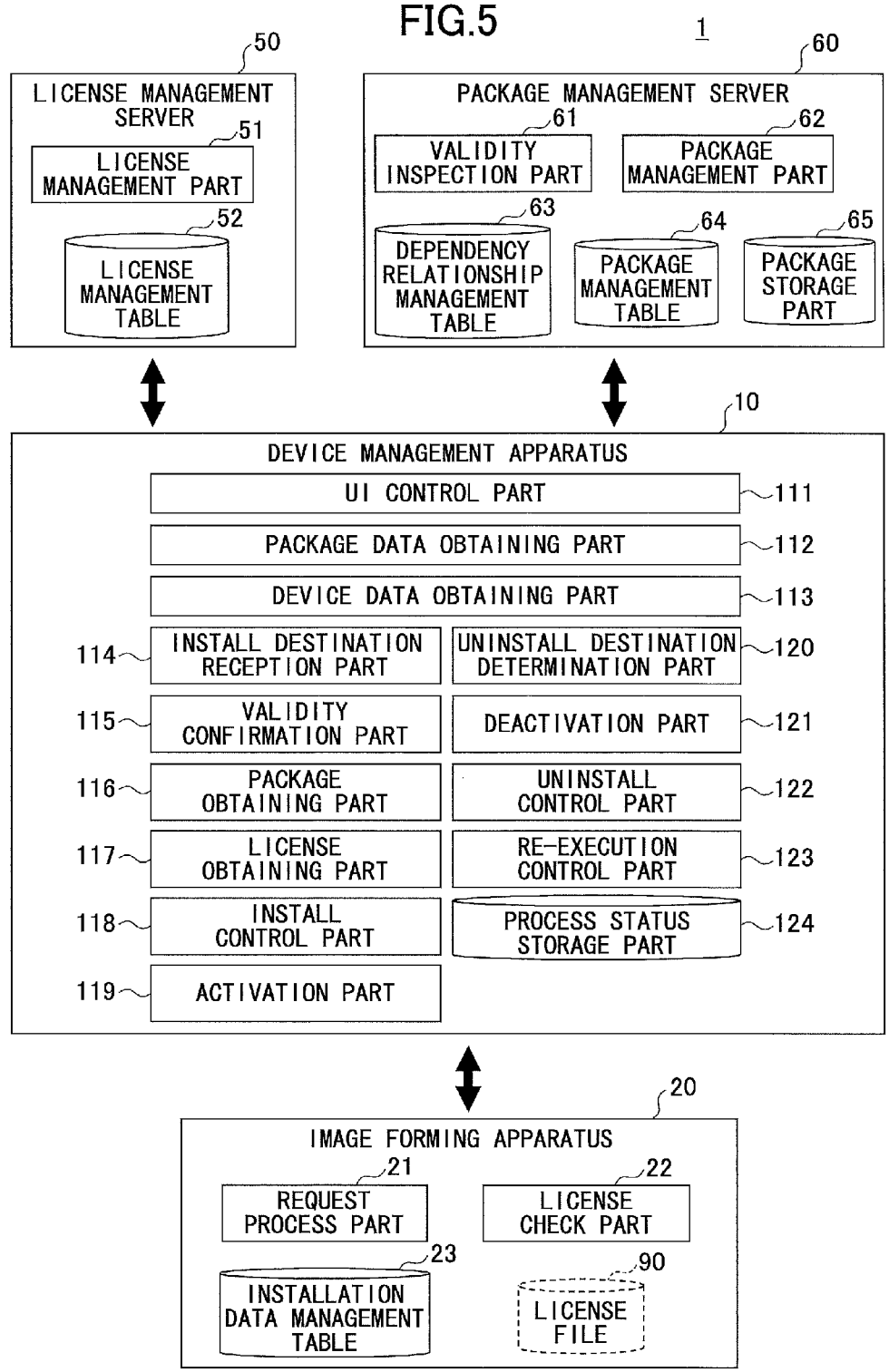
FIG. 5 is a schematic diagram illustrating a configuration of the functions of the device management system according to an embodiment of the present invention.

FIG. 5 is a schematic diagram illustrating a configuration of the functions of the device management system 1 according to an embodiment of the present invention.

In FIG. 5, an image forming apparatus 20 includes, for example, a request process part 21, a license check part 22, and an installation data management table 23. The request process part 21 performs various process in response to a request from a device management apparatus 10. The processes include, for example, transmitting device data, installing a sales package, acquiring a license file 90, uninstalling a sales package, and deleting a license file 90.

The license file 90 is a file in which data that certifies the license of a sales package (data for authorizing the use of the sales package). That is, a sales package (component) according to this embodiment cannot be used by the image forming apparatus 20 merely by obtaining the entity of the sales package. The image forming apparatus 20 can use the sales package when the license file 90 of the sales package is acquired by the image forming apparatus 20.

At the time of using the sales package, the license check part 22 determines whether the use of the sales package is permissible based on the license file 90. The installation data management table 23 is a table for managing, for example, the sales packages installed in the image forming apparatus 20. The installation data management table 23 is stored in, for example, a storage device of the image forming apparatus 20.

The license management server 50 includes, for example, a license management part 51 and a license management table 52. The license management part 51 manages licenses of the sales packages by referring to the license management table 52. For example, the license management part 51 issues licenses pertaining to sales packages. The license management part 51 can also release the licenses. The license management table 52 is a table in which, for example, the statuses of licenses of sales packages are recorded. The license management table 52 is stored in, for example, a storage device of the license management server 50.

The package management server 60 includes, for example, a validity inspection part 61, a package management part 62, a dependency relationship management table 63, a package management table 64, and a package storage part 65.

The validity inspection part 61 is for determining whether the dependency relationship included in a target install sales package (sales package to be installed in the image forming apparatus 20) can be solved based on, for example, the function package already installed in the image forming apparatus 20 by referring to the dependency relationship management table 63. For example, the validity inspection part 61 determines whether a function package included in the target install sales package is already included in the function packages installed in the image forming apparatus 20.

The package management part 62 manages the sales packages stored (recorded) in the package storage part 65. For example, the package management part 62, in response to a request for downloading a sales package, obtains the sales package from the package storage part 65 and transmits the sales package to the source of the request.

The dependency relationship management table 63 is a table in which data indicating relationships between function packages and data indicating relationships between function packages and firmware are recorded. The dependency relationship management table 63 is stored in, for example, a storage device of the package management server 60. The package management table 64 is a table for managing data indicating the associations between sales packages and function packages (association data). The package management table 64 is stored in, for example, a storage device of the package management server 60. The package storage part 65 is a storage space in a storage device of the package management server 60 for storing entities of components (e.g., sales packages, firm ware) in association with corresponding product IDs.

The device management apparatus 10 includes, for example, a UI (User Interface) control part 111, a package data obtaining part 112, a device data obtaining part 113, an install destination reception part 114, a validity confirmation part 115, a package obtaining part 116, a license obtaining part 117, an install control part 118, an activation part 119, an uninstall destination determination part 120, a deactivation part 121, an uninstall control part 122, a re-execution control part 123, and a process status storage part 124. Each of these parts included in the data management apparatus 10 is realized by causing a CPU 104 (see FIG. 6) of the device management apparatus 10 to execute a program installed in, for example, an auxiliary storage device 102 (see FIG. 6) of the device management device 10.

The UI control part 111 receives various instructions (e.g., instructions to install or uninstall a sales package) from the user. The package data obtaining part 112 obtains data pertaining to sales package to be installed or uninstalled from the license management server 50. The device data obtaining part 113 obtains device data from the image forming apparatus 20. The device data includes data pertaining to the sales package and firmware that are installed in the image forming apparatus 20. The install destination receiving part 114 receives a user's designation of a destination (image forming apparatus 20) to which the sales package is to be installed. The validity confirmation part 115 instructs the validity inspection part 6 of the package management server 60 to determine the validity (appropriateness) of installing the target install sales package (sales package to be installed) to the image forming apparatus 20.

The package obtaining part 116 downloads (obtains) the target install sales package (sales package to be installed) from the package management server 60. The license obtaining part 117 obtains the license file 90 corresponding to the target install sales package from the license management server 50. The install control part 118 instructs the image forming apparatus 20 to perform a process of installing the sales package by transmitting the sales package to the image forming apparatus 20. The activation part 119 instructs the image forming apparatus 20 to perform a process of acquiring a license by transmitting the license file 90 to the image forming apparatus 32.

The uninstall destination determination part 120 determines whether a target uninstall sales package (sales package to be uninstalled) is installed in the image forming apparatus 20. The deactivation part 121 transmits a request to delete the license file 90 to the image forming apparatus 20 and request the release of the license corresponding to the license file 90 to the license management server 50. The uninstall control part 122 requests the image forming apparatus 20 to uninstall the sales package.

The re-execution control part 123 determines the status of a series of processes including a process of installing a sales package and a process of acquiring a license or a series of processes including a process of releasing a license and a process of uninstalling a sales package based on the data recorded in the process status storage part 124. In a case where an error occurs in the middle of the series of processes and one of the processes is interrupted, the re-execution control part 123 resumes the series of processes beginning from the part of the interruption. The process status storage part 124 is a storage part that sequentially records the status of the series of processes (e.g., series of processes including the installing process or series of processes including the uninstalling process) as the series of processes progresses. The process status storage part 124 may be, for example, a single file (e.g., archive file) or a folder.

Figure 6:
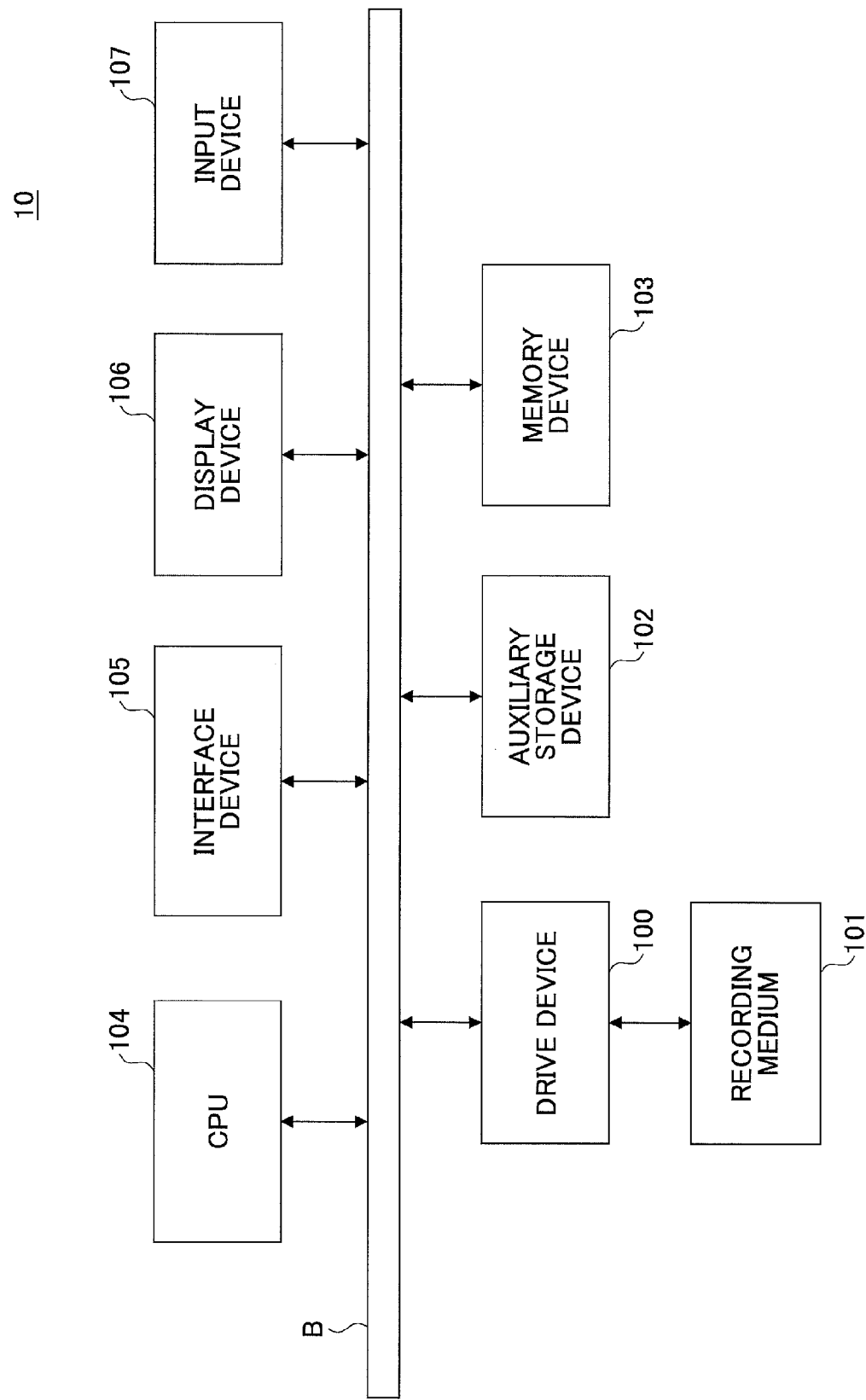
FIG. 6 is a schematic diagram illustrating a hardware configuration of the device management apparatus according to an embodiment of the present invention.

FIG. 6 is a schematic diagram illustrating a hardware configuration of the device management apparatus according to an embodiment of the present invention. The device management apparatus 10 illustrated in FIG. 6 includes a drive device 100, an auxiliary storage device 102, a memory device 103, a CPU 104, and an interface device 105, a display device 106, and an input device 107 that are connected to each other by a bus B.

The program for performing the processes in the device management apparatus 10 is recorded on a recording medium (computer readable recording medium) 101 such as a CD-ROM. When the recording medium 101 having the program recorded thereon is placed in the drive device 100, the program is installed from the recording medium 101 to the auxiliary storage device 102 via the drive device 100. It is, however, to be noted that the program is not always required to be installed from the recording medium 101 but could also be downloaded from another computer via a network. In addition to storing installed programs, the auxiliary storage device 102 also stores necessary files and data therein.

In a case where activation of the program is instructed, the program is read out from the auxiliary storage device 102. The CPU 104 executes the functions of the device management apparatus 10 according to the program stored in the memory device 103. The interface device 105 is used as an interface for connecting with the network. The display device 106 displays, for example, a GUI (Graphic User Interface) according to the program. The input device 107 includes, for example, a keyboard and a mouse and the like for inputting various maneuvers and commands.

Figure 7:
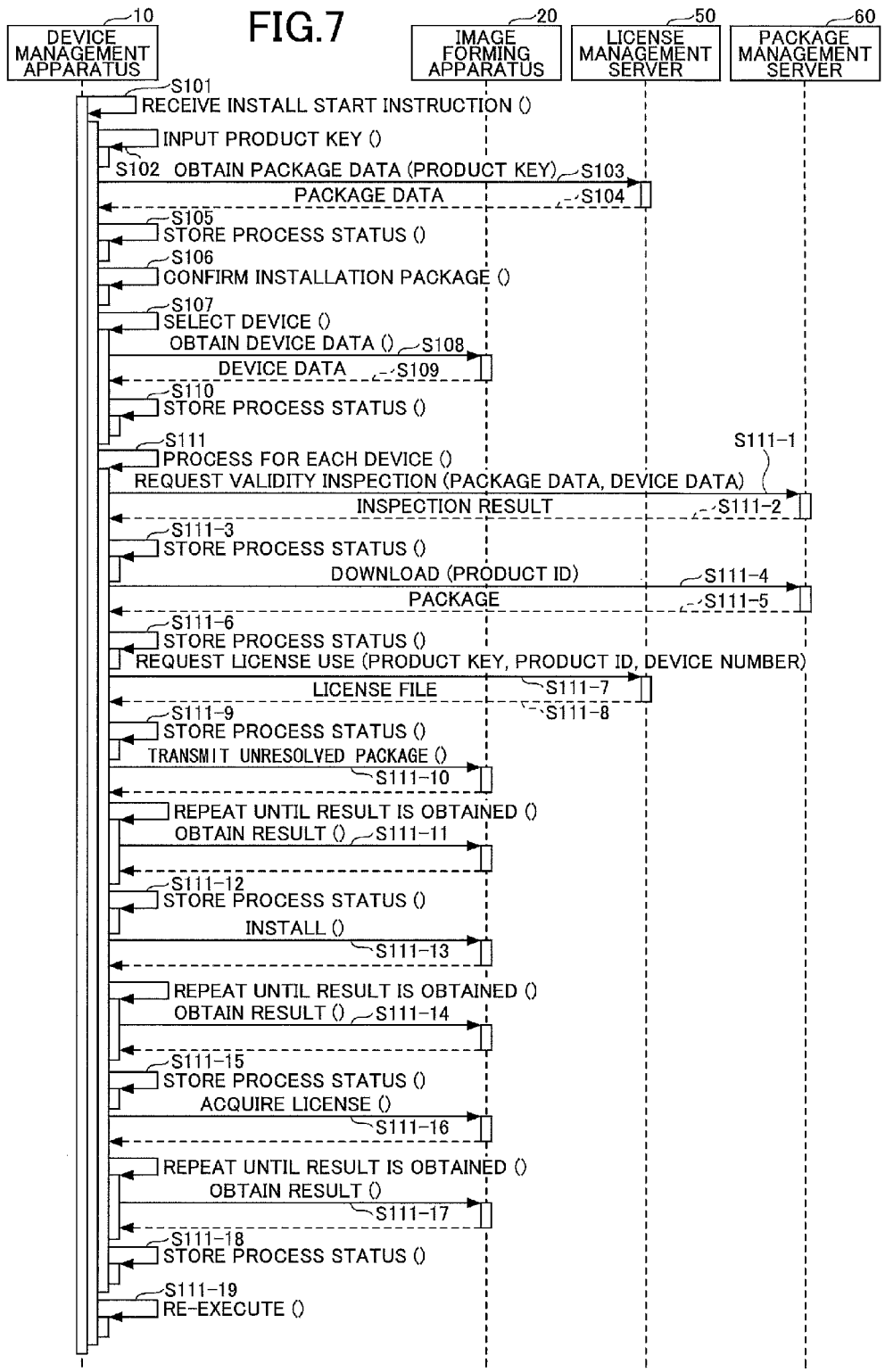
FIG. 7 is a sequence diagram for describing processes performed in an operation of installing and activating a sales package according to an embodiment of the present invention.

Next, an exemplary operation of the device management system 1 is described. FIG. 7 is a sequence diagram for describing processes performed in an operation of installing and activating a sales package according to an embodiment of the present invention. In FIG. 7, it is assumed that the user of the image forming apparatus 20 has purchased a commercial product of a sales package and obtained a product key of the commercial product.

In this embodiment, the commercial product is an embodiment of a concept consisting of i) a sales package or a group of sales packages and ii) the content of the license of the sales package or the group. Therefore, even where the commercial products have the same sales package, the commercial products are different if the contents of the license of the sales packages (e.g., license type, license validity period, license volume number) are different. The license type is data for distinguishing licenses such as a sell-off type license, time-limit type license, or a trial type license. The sell-off type license is a license that can be used without any time limit once the commercial product of the license is purchased (sold-off). The time-limit type license is a license that can be used only for a limited time. The trial type license is a license that offers a trial for use. The "license validity period" indicates the period in which the license is valid. The "license validity period" is an attribute which is valid in a case where the type of license is the time-limit type license or the trial type license. The "license volume number" indicates the number of volume licenses. In a case where a commercial product having a volume number of 2 or more is purchased, a volume license is granted to the purchaser, so that the purchaser is allowed to use the same sales package at the same time within the limits of the volume number of 2 or more.

Therefore, the act of purchasing a commercial product not only expresses the will of selecting a sales package but also expresses the will of selecting the content of the license.

Further, the product key is an identifier uniquely issued (assigned) whenever a commercial product is purchased. The product key is used as data for identifying the license (authority for use) of the sales package contained in the commercial product (license identifier). The product key is also used as data for certifying the authenticity of the purchaser of the commercial product. It is to be noted that, in this embodiment, the product key is to be clearly distinguished from a product ID. That is, the product ID is for differentiating the sales package whereas the product key is for differentiating the act of purchasing a commercial product. Therefore, even where the sales package has the same product ID, different product keys are issued whenever the commercial product is purchased.

It is to be noted that the method of purchasing the commercial product is not limited in particular. For example, the commercial product may be purchased by transactions at a shop or by electronic transactions (e.g., by using a website). In a case of the former, the product key is typically adhered to, for example, a CD-ROM on which the sales package is recorded. In a case of the latter, the product key may be displayed on the Web page when the purchase is finalized or reported by electronic mail. In the example of FIG. 7, it is assumed that the user uses the device management apparatus 10 to install and activate (obtaining of license) a sales package of a purchased commercial product for each image forming apparatus.

In a case where the UI control part 111 of the device management apparatus 10 receives an instruction to start installing the sales package according to the input to an initial screen displayed on the display device 106, the UI control part 111 instructs the display device 106 to display a product key input screen (Step S101). When the user inputs the product key of the sales package to be installed (hereinafter also referred to as "current sales package") to a product key input screen (Step S102), the package data obtaining part 112 designates the input product key together with transmitting a request to obtain package data of the designated product key to the license management server 50 (Step S103).

Figure 8:
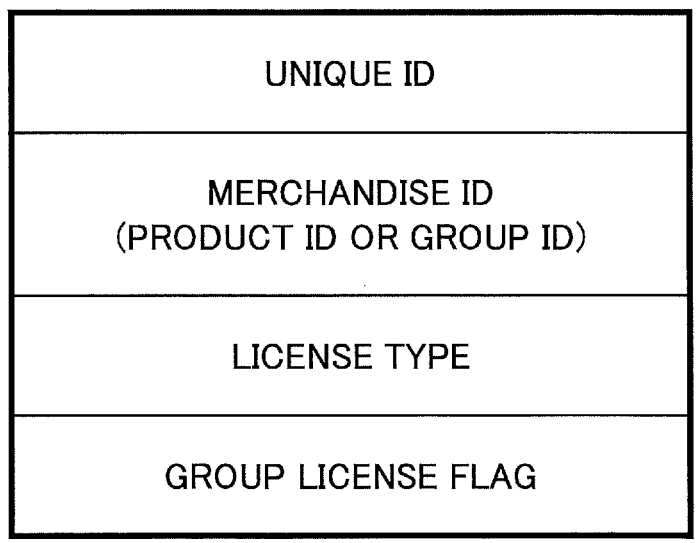
FIG. 8 is a schematic diagram illustrating an exemplary configuration of a product key.

FIG. 8 is a schematic diagram illustrating an exemplary configuration of a product key. As illustrated in FIG. 8, the product key includes data pertaining to, for example, unique ID, product ID, license type, and a group license flag.

The unique ID is a unique ID generated along with the generation of the product key. That is, the uniqueness of the product key is attained by the unique ID. The commercial product ID is a product ID or a group ID of the sales package of the purchased commercial product. The license type is a license type of the purchased commercial product. The group license flag is a parameter indicating whether the commercial product ID in the product key is a group ID (true or false).

The license management part 51 of the license management server 50 receives the request for obtaining the package data and determines the validity of the product key designated with the obtaining request by referring to a license management table 52.

FIG. 9 illustrates an example of the license management table 52. The license management table 52 includes items corresponding to each license issued to the sales packages, such as management number, product key, product ID, device number, status, license type, license validity period, license validity date, and license issue date.

Among these items, values corresponding to the management number, the product key, the product ID, the status, the license type, and the license period are recorded to the license management table 52 when the commercial product is purchased.

On the other hand, values corresponding to the device number, the license validity data, and the license issue date are recorded to the license management table 52 according to the issuing of the license (i.e. issuing of the license file). Further, the value of the item "status" is updated according to the issuing of the license.

The management number is an identifier (number) uniquely assigned to each record when records of the license management table 52 are generated. The product key, the product ID, the license type, and the license validity have been described above.

The device number of the image forming apparatus 20 designated as the device using the sales package is recorded as the device number when the license file 90 is issued. The device number is identification data (device identifier) for uniquely identifying each image forming apparatus 20. The status is data indicating the status of a license. In this embodiment, the statuses of the license are "no license", "check out", and "check in". "No license" indicates that a license is not issued. "Check out" indicates that a license is being used. "Check in" indicates that a license is released (available). The license validity date indicates the validity date of a license (license file 90) obtained by calculating the validity period when issuing the license file 90. The license issue data indicates the issue date of the license (license file 90) that is registered when the license file 90 is issued.

In the table illustrated in FIG. 9, the product key and the product ID of the records corresponding to management numbers 1-3 are the same. This indicates that the commercial product corresponding to the product key "KEY001" is a commercial product having a volume license of 3. Further, the records corresponding to management numbers 4 and 5 have the same product key but different product ID. This indicates that the commercial product corresponding to the product key "KEY002" is a commercial product having a group license including two kinds of sales packages. It is to be noted that "group license" is a license assigned to a group.

By using the above-described license management table 52, the license management part 51 determines the validity of the product key. For example, in a case where a record including the received product key is registered in the license management table 52, the status of the recording including the received product key is not "check out", and the license validity date of the recording including the receiving product key has not surpassed the present time (this case includes a case where a value corresponding to the license validity date is not registered), the license management part 51 determines that the product key is valid. Other than such a case, the product key is determined to be invalid.

In a case where the product key is determined to be invalid, the license management part 51 transmits error data indicating that the product key is invalid to the package data obtaining part 112 in response to the request from the package data obtaining part 112. In this case, the package data obtaining part 112 instructs the display device 106 to display the error data. Thereby, the installing operation is canceled.

In a case where the product key is determined to be valid, the license management part 51 transmits data (package data) recorded to the record (record of the license management table 52) corresponding to the product key to the package data obtaining part 112 (Step S104).

The package data includes at least the product ID (product ID of current sales package) associated to the product key. Further, in a case where the product key is for a group license or a volume license, data of plural product IDs (plural records) are included in the package data.

When the package data obtaining part 112 receives the package data, the package data obtaining part 112 generates a process status storage part 124 corresponding to the current process in the auxiliary storage device 102 and stores the current process status in the process status storage part 124 (Step S105). More specifically, the package data obtaining part 112 records the product key, the package data to the process status storage part 124. Accordingly, the contents stored in the process status storage part 124 are stored in the manner illustrated in FIG. 10.

Figure 10:
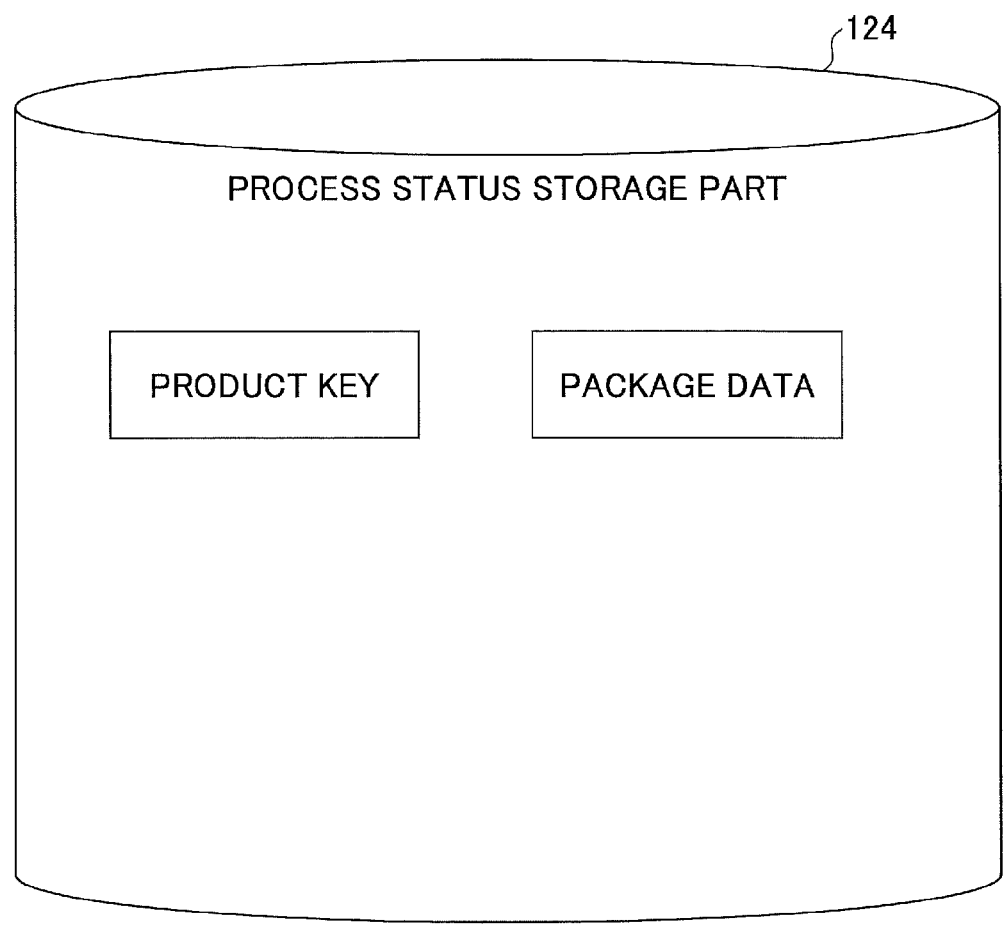
FIG. 10 is a schematic diagram illustrating an example of the contents stored in a process status storage part after package data is obtained.

FIG. 10 is a schematic diagram illustrating an example of the contents stored in the process status storage part 124 after the package data is obtained. As illustrated in FIG. 10, the product key and the package data are recorded to the process status storage part 124 after Step S104.

Then, the UI control part 111 of the device management device 10 instructs the display device 106 to display a screen (confirmation screen) including the received package data, so that the user can confirm the contents of the current sales package and the contents of the license (Step S106).

Then, when the user inputs an instruction to continue the installing operation (for example, when the user presses an OK button on the confirmation screen), the install destination reception part 114 instructs the display device 106 to display a device selection screen including a list of image forming apparatuses 20, so that the user can select the image forming apparatus 20 in which the current sales package is to be installed (Step S107). It is possible to select plural image forming apparatuses from the device selection screen. The image forming apparatuses displayed in the device selection screen are image forming apparatuses having data such as their IP addresses and host names stored in the auxiliary storage device 102 beforehand. Further, the device information obtaining part 113 may dynamically search for the image forming apparatus 20 connected to the network 30 by issuing, for example, a broadcast on the network 30 and instruct the display device 106 to display the device selection screen including, for example, the host name of the searched image forming apparatus 20.

Then, the device data obtaining part 113 transmits a request to obtain device data to each of the image forming apparatuses selected from the device selection screen (Step S108). When the request process part 21 of each image forming apparatus 20 receives the request for device data, the request process part 21 obtains data recorded in the install data management table 23 and transmits the obtained data and the device number of the image forming apparatus 20 to the device data obtaining part 113 (Step S109).

FIG. 11 illustrates an example of the install data management table according to an embodiment of the present invention. In FIG. 11, items such as "product ID", "version", "product ID of function package", "activation flag", and "license validity date" are recorded (registered) in the install data management table in correspondence with each sales package or firmware installed in the image forming apparatus 20.

The "product ID of function ID" indicates a list of product IDs of function packages belonging to sales packages. The "activation flag" indicates whether a sales package is activated (whether activation is completed). The "license validity date" indicates the validity date of the license issued for the sales package (validity date of the license file 90). The activation flag and license validity date for each function package are compliance with the activation flag and the license validity date of the sales package to which the function package belongs. Further, the contents of the install data management table are registered (recorded) when installing the sales packages (described below). It is to be noted that the device data transmitted in Step S109 includes all of the data registered in the install data management table 23. Further, "firmware" refers to a program component located in a layer lower than the function package. That is, "firmware" provides functions that are more basic than those of the function package to the function package. Firmware is installed in the image forming apparatus 20 beforehand and requires no obtaining of licenses in order to be used. Therefore, with respect to records of the install data management table 23 pertaining to firmware, the items for "function package", "activation flag", and "license validity date" are invalid. For the sake of convenience, data pertaining to firmware and data pertaining to sales package are managed in the same install data management table 23 of FIG. 11. However, data pertaining to firmware and data pertaining to sales package may be managed using separate tables.

Then, the device data obtaining part 113 stores the current process status by updating the process status storage part 124 (Step S110). More specifically, the device data obtaining part 113 records (generates) the device management table (including the obtained device number and device data for each image forming apparatus 20) in the process status storage part 124. As a result, the contents stored in the process status storage part 124 are illustrated in FIG. 12.

Figure 12:
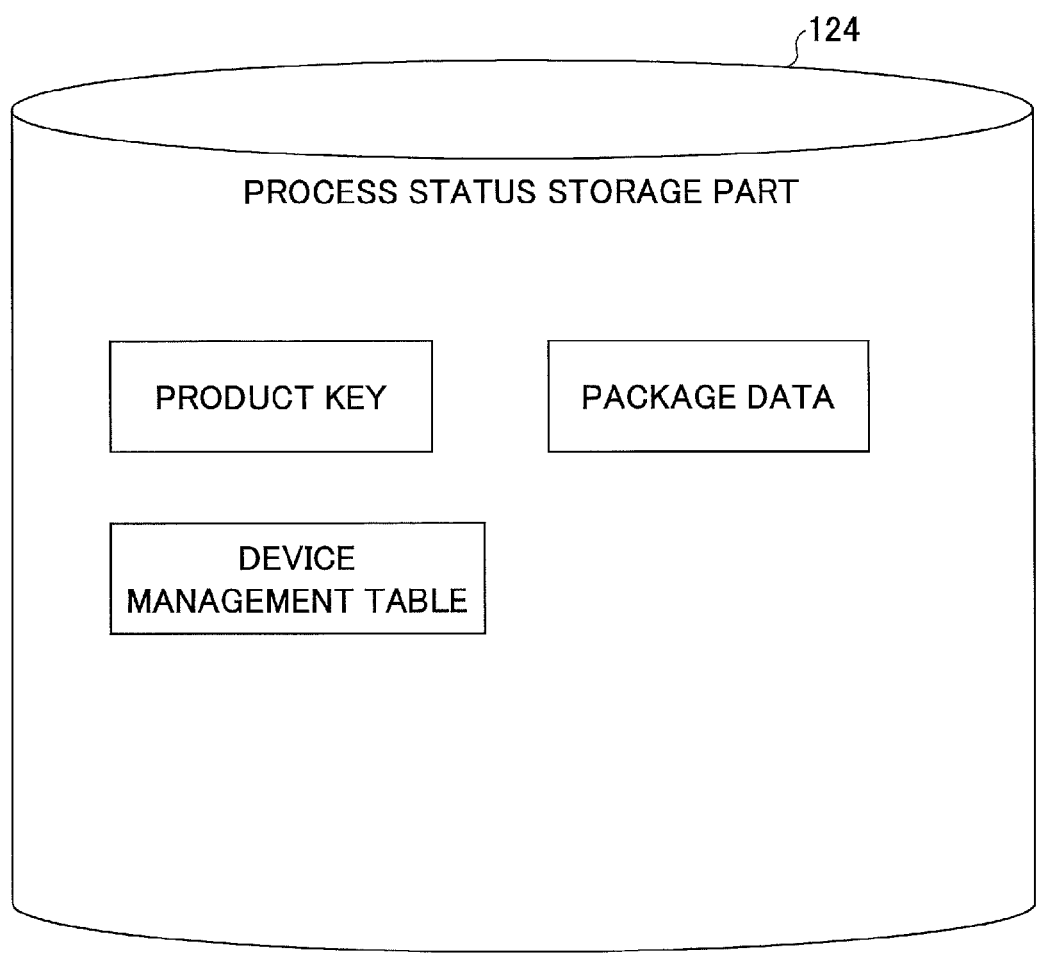
FIG. 12 is a schematic diagram illustrating an example of the contents stored in a process status storage part 124 after device data is obtained.

FIG. 12 is a schematic diagram illustrating an example of the contents stored in the process status storage part 124 after the device data are obtained. As illustrated in FIG. 12, the device management table is added to the process status storage part 124.

An example of the configuration of the device management table recorded in the process status storage part 124 is illustrated in FIG. 13.

FIG. 13 is a schematic diagram illustrating an example of the device management table. As illustrated in FIG. 13, the device management table has a configuration allowing items such as "IP address", "device number", "device data", "validity inspection result", and "process status" to be recorded in correspondence with each image forming apparatus 20. After device data is obtained, "IP address", "device number" and "device data" based on the IP address are recorded in the device management table. The "validity inspection result" is an item in which the results of a validity inspecting process (described below) for each image processing apparatus 20 are recorded. The "process status" is an item in which the process statuses for each image processing apparatus 20 are recorded. Accordingly, in this example, a value indicating the completion of the device data obtaining process ("device data obtaining complete") is recorded in the item "process status". However, in a case where device data could not be obtained from the image forming apparatus 20 (failure of device data obtaining process), no value is recorded in the item "process status". Alternatively, a value indicating the failure of the device data obtaining process ("device data obtaining process incomplete") may be recorded in the item "process status". In this case, "device number" and "device data" of the image forming apparatus 20 would not be registered in the device management table. Accordingly, by referring to the values of the item "process status" of the device management table, it can be determined whether device data for each image forming apparatus 20 is obtained.

Then, Step S111 is a loop process that is executed for each image forming apparatus 20 from which device data are successfully obtained. The image forming apparatuses 20 subjected to the loop process are hereinafter referred to as "current devices". With respect to image forming apparatuses 20 from which device data could not obtained (failure of image obtaining process), the following steps are not executed.

In S111-1, the validity confirmation part 115 transmits a validity inspection request including the device data of the current device and package data obtained by the package data obtaining part 112 to the package management server 60. In this example "validity" indicates the validity (appropriateness) of installing the function package included in the current sales package into the current device. The validity inspection part 61 of the package management server 60 inspects validity according to the received validity inspection request by referring to a dependency relationship management table 63.

Figure 14:
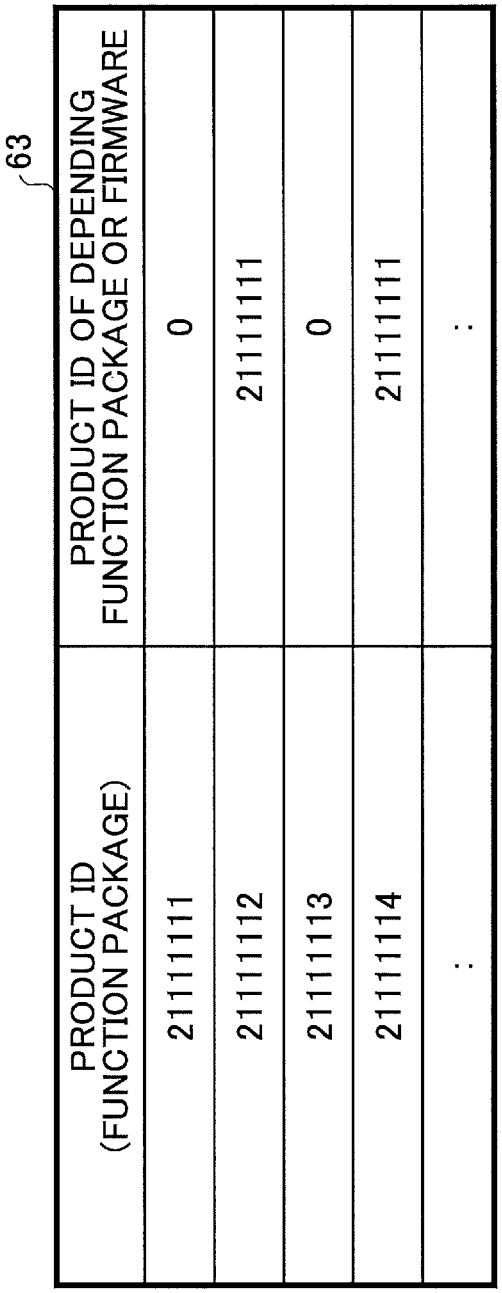
FIG. 14 is a schematic diagram illustrating an example of a dependency relationship management table according to an embodiment of the present invention.

FIG. 14 is a schematic diagram illustrating an example of the dependency relationship management table according to an embodiment of the present invention. In the example of FIG. 14, the dependency relationship management table includes a product ID of a subordinate function package and a product ID of a function package(s) depended by the subordinate function package (target function package depended by the subordinate function package). Plural product IDs of function packages and firmware may be registered as the target function package. In FIG. 14, "0" indicates that there are no function packages or firmware depended by the subordinate function package (i.e. no target function package).

In inspecting validity, the validity inspection part 61 obtains a list of product IDs of function packages belonging to the current sales package from a package management table 64.

Figure 15:
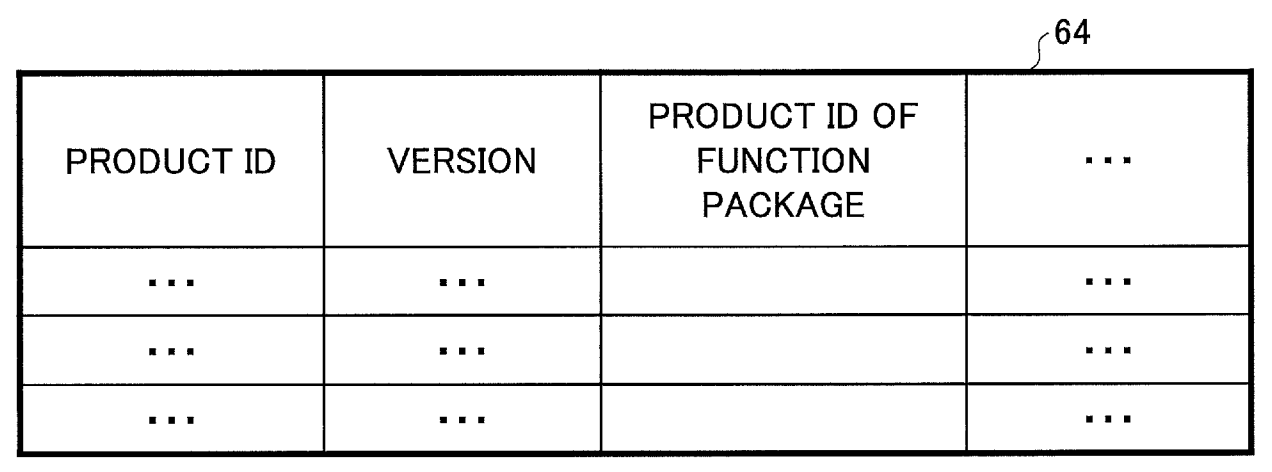

FIG. 15 is a schematic diagram illustrating an example of the package management table 64 according to an embodiment of the present invention. As illustrated in FIG. 15, "product ID", "version", "product ID of function package" are registered in the package management table 64 in correspondence with each sales package. The "product ID of the function package" includes a list of product IDs of function packages belonging to sales packages.

Then, the validity inspection part 61 identifies the function package or firmware depended by a subordinate function package (target package) based on the obtained product ID of each function package and the dependency relationship management table 63. In a case where there is a target package, it is determined whether the product ID of the target package is included in the device data. In a case where the product IDs of all target packages are included in the device data, the validity inspection part 61 determines that the record corresponding to the current device are valid. In a case where there is at least one product ID that is not included in the device data (unresolved package), the validity inspection part 61 determines that the record corresponding to the current device are invalid. It is to be noted that there may be plural target packages corresponding to a single function package. Further, the search of a dependency relationship is performed recursively.

Then, the validity inspection part 61 transmits inspection results to the validity confirmation part 115 (S111-2). In a case where the validity inspection part 61 determines that the record corresponding to the current device are invalid, the program ID of the unresolved package is included in the inspection results.

Then, the validity confirmation part 115 stores the current process status by updating the process status storage part 124 (Steps S111-3). More specifically, the validity confirmation part 115 stores (records) the inspection results in the device management table as values of the inspection results pertaining to the validity of the record corresponding to the current device. Therefore, in a case where it is determined that the record corresponding to the current device is invalid, the product ID of the unresolved package is recorded in the "validity inspection result" of the corresponding record. Further, in a case where the inspection of validity is successful, the item "process status" of the corresponding record in the device management table is updated with a value indicating "validity inspection complete". In this example, inspection of validity may be successful regardless of the inspection results (i.e. valid or invalid). That is, a case of successful validity inspection indicates that the inspection of validity is performed normally and that the inspection results could be received. A case of unsuccessful validity inspection indicates that nothing is recorded in the item "validity inspection result" of the corresponding record and that the value in the item "process status" is not updated. Further, in the case of unsuccessful validity inspection, the following steps (processes) are not performed for the current device and the steps in and after Step S111-1 are performed for the next image forming apparatus 20.

Then, the package obtaining part 116 designates the product ID of the current sales package and transmits a download request to the package management server 60 (Step S111-4). The package management part 62 of the package management server 60 obtains the sales package corresponding to the designated product ID from the package storage part 65 and transmits the obtained sales package to the package obtaining part (Step S111-5). In a case where there are plural current sales packages, the downloading is repeated plural times (Step S111-4, S111-5). In a case where an inspecting result indicating "invalid" is received, the unresolved package is also downloaded. Further, the case where there are plural current sales packages is a case a case where the product key input in Step S101 is used for a group license or a case where the plural product keys are input.

Then, the package obtaining part 116 stores the current process status by updating the process status storage part 124. More specifically, the package obtaining part 116 associates the obtained sales package or the unresolved package to the current device and stores the associated data in the process status storage part 124 (Step S111-6). The method of associating the sales packages or the unresolved packages to the current device is not limited in particular. In this embodiment, the associating method is performed by storing the obtained (downloaded) sales package in a single archive file (hereinafter also referred to as "package archive file") and including the device number of the current device in the file name of the package archive file. As for other associating methods, there are, for example, creating a folder having the device number of the current device as the folder name and storing the downloaded sales packages or unresolved packages in the created folder. As a result, the contents of the data stored in the process status storage part 124 are illustrated in FIG. 16.

Figure 16:
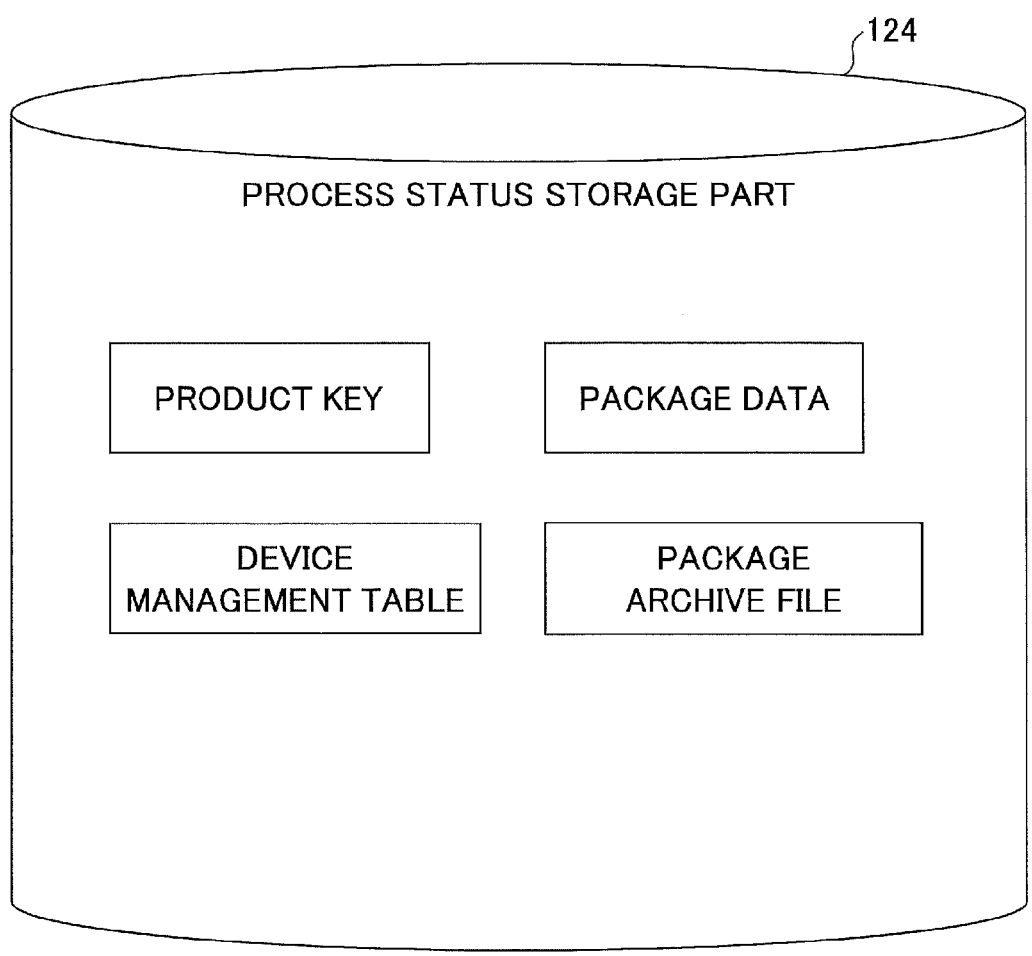
FIG. 16 is a schematic diagram illustrating an example of the contents stored in a process status storage part after a sales package is downloaded according to an embodiment of the present invention.

FIG. 16 is a schematic diagram illustrating an example of the contents stored in the process status storage part 124 after the sales package is downloaded according to an embodiment of the present invention. As illustrated in FIG. 16, the package archive file is added to the process status storage part 124.

In a case where the downloading of all the sales packages or unresolved packages has succeeded, the values in the item "process status" of the record of the device management table corresponding to the current device is updated to a value indicating completion of downloading the sales package ("package obtaining complete").

In a case where the downloading of any of the sales packages or unresolved packages is unsuccessful, the value in the item "process status" of the record of the device management table corresponding to the current device is not updated and the below-described steps (processes) are not performed for the current device. Therefore, the steps on and after Steps S111-1 are performed for the next image forming apparatus 20.

Then, the license obtaining part 117 designates a product key input in Step S101, the product ID of the current sales package, and the device number of the current device and transmits a license use request (request for using license, that is, request for issuing a license file 90) to the license management server 50 (Step S111-7).

The license management part 51 of the license management server 50 generates a license file 90 based on the data included in the license use request and the license management table 52 and transmits the generated license file 90 to the license obtaining part 117 (Step S111-8).

Figure 17:
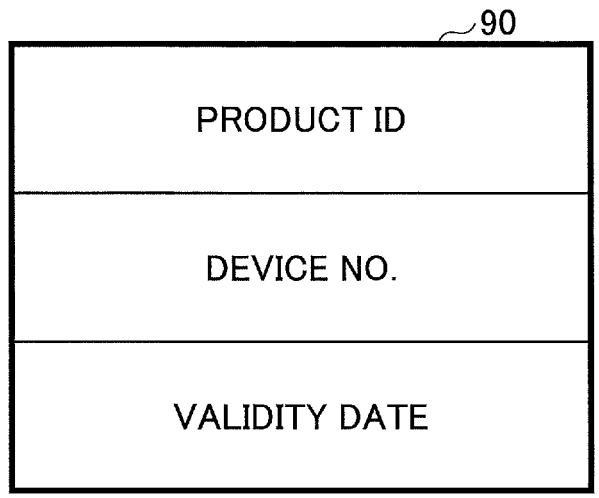
FIG. 17 is a schematic diagram illustrating an example of a license file according to an embodiment of the present invention.

FIG. 17 is a schematic diagram illustrating an example of the license file 90 according to an embodiment of the present invention. In the example of FIG. 17, the license file 90 includes a product ID, a device number, and validity data. The product ID is a product ID of a sales package assigned a license (permission to use) by the license file 90. The device number is a device number of the image forming apparatus 20 permitted to use the sales package corresponding to the product ID according to the license file 90. The validity data includes the validity date of the license file 90, that is, the validity date of the license assigned by the license file 90.

The product ID of the product key including the license use request is registered in the product ID of the license file 90. In this example, in a case where the product key is a product key for a group license, that is, in a case where plural different product IDs are registered in the license management table 52 with respect to a product key, the license management part 51 generates the license file 90 for each sales package. Therefore, even for a group license, the product ID of the sale package (not the group ID) is registered in the product ID of the license file 90.

The device number included in the license use request is registered in the device number of the license file 90. The date, which is obtained by adding a predetermined validity period to the current date, is registered as the validity date (e.g., year/month/day) of the license file 90. The predetermined validity period is the validity period registered in the license management table 52 for the product key included in the license use request and the product ID.

Then, the license obtaining part 117 stores the current process status by updating the process status storage part 124 (Step S111-9). More specifically, the license obtaining part 117 records the obtained license file 90 in the process status storage part 124 in association with the current device. In this embodiment, the obtained license file 90 is associated with the current device by storing the obtained license file 90 in a single archive file (hereinafter also referred to as "license archive file") and including the device number of the current device in the file name of the license archive file. However, similar to associating the sales package with the current device, the license file 90 and the current device can be associated with each other by other methods. As a result, the contents stored in the process status storage part 124 are illustrated in FIG. 18.

Figure 18:
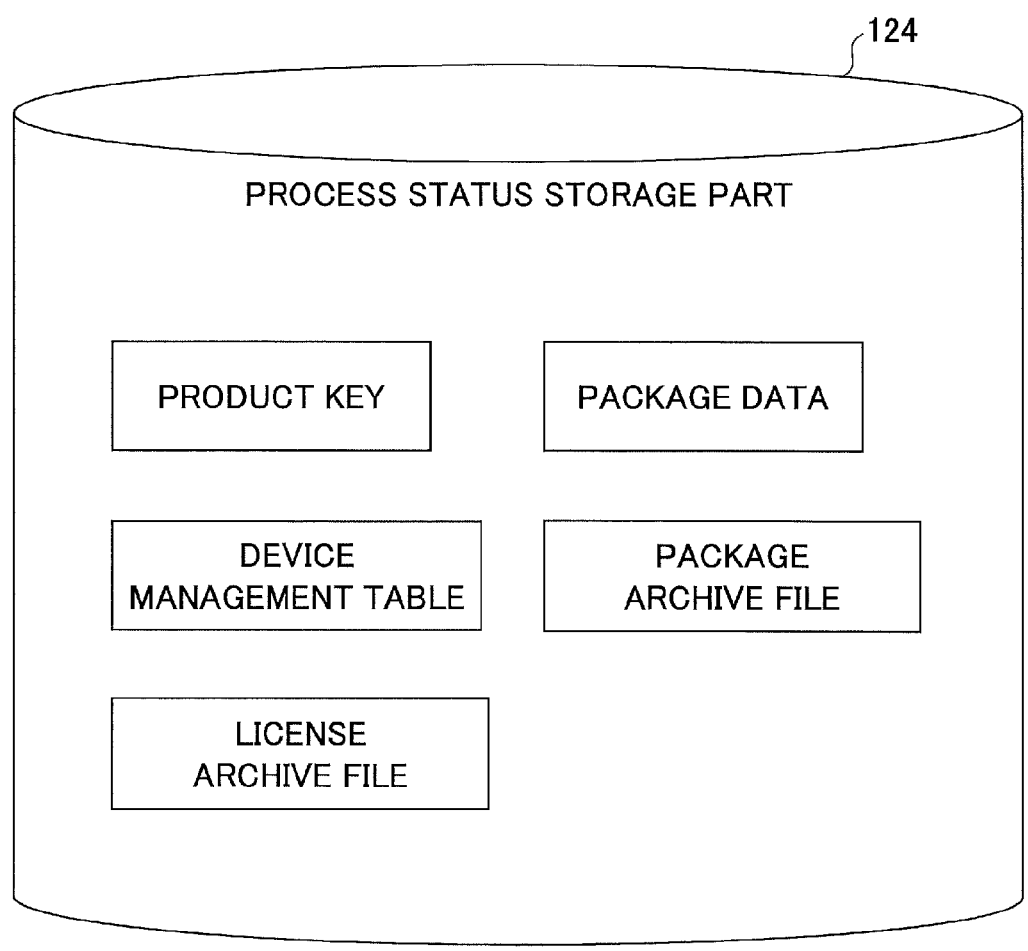
FIG. 18 is a schematic diagram illustrating an example of the contents stored in a process status storage part after a license file is obtained according to an embodiment of the present invention.

FIG. 18 is a schematic diagram illustrating an example of the contents stored in the process status storage part 124 after the license file is obtained according to an embodiment of the present invention.

In a case where the license obtaining part 117 succeeds in downloading the license file 90, the value of the process status of the record of the license file 90 corresponding to the current device is updated to a value indicating that obtaining of the sales license is completed (license obtaining completed).

It is to be noted that, in a case where the license obtaining part 117 fails in downloading (obtaining) the license file 90, the value of the process status of the record of the license file 90 corresponding to the current device is not updated and the below-described steps (processes) are not performed for the current device. Accordingly, the steps of Step S111-1 and after are performed for the next image forming apparatus 20.

Then, in a case where the unresolved package is obtained in Step S111-5, the install control part 118 transmits the unresolved package stored in the package archive file to the current device and requests the current device to install the unresolved package (Step S111-10). The request process part 21 of the current device installs the unresolved package and records data of the unresolved package (e.g., product ID) in the install data management table 23.

Then, the install control part 118 queries installation results of the unresolved package to the current device (Step S111-11). The query (polling) is repeated until installing by the current device is completed and the installation result is returned (transmitted) to the install control part 118.

Then, the install control part 118 stores the current process status by updating the process status storing part 124 (Step S111-12). More specifically, in a case where the installing of the unresolved package has succeeded, the install control part 118 updates the value of the record "process status" corresponding to the current device in the device management table to a value indicating the completion of installing the unresolved package (installing of unresolved package complete). On the other hand, in a case where the installing of the unresolved package has failed, the value of the record "process status" corresponding to the current device in the device management table is not updated and the below-described steps (processes) are not performed for the current device. Accordingly, the steps of Step S111-1 and after are performed for the next image forming apparatus 20.

The reason for installing the unresolved package beforehand is to prevent failure of installing of the sales package due to a depended component not being installed.

Then, the install control part 118 transmits the sales package obtained in Step S111-5 to the current device (sales package stored in the package archive file) and requests the current device to install the sales package (Step S111-13). The request process part 21 of the current device installs the sales package and records data of the sales package (e.g., product ID) in the install data management table 23.

Then, the install control part 118 queries the result of installing the sales package to the current device (Step S111-14). The query (polling) is repeated until installing by the current device is completed and the installation result is returned (transmitted) to the install control part 118.

Then, the install control part 118 stores the current process status by updating the process status storing part 124 (Step S111-15). More specifically, in a case where the installing of the sales package has succeeded, the install control part 118 updates the value of the record "process status" corresponding to the current device in the device management table to a value indicating the completion of installing the sales package (installing of sales package complete). In this case, the package archive file associated with the current device may be deleted.

On the other hand, in a case where the installing of the sales package has failed, the value of the record "process status" corresponding to the current device in the device management table is not updated. Further, the package archive file associated with the current device is not deleted. Further, the below-described steps (processes) are not performed for the current device. Accordingly, the steps of Step S111-1 and after are performed for the next image forming apparatus 20.

Then, the activation part 119 transmits the license file 90 (license file 90 stored in the license archive file) obtained in Step S111-6 to the current device and requests the current device to acquire (set) the license file 90 (Step S111-16). For example, the request processing part 21 of the current device records data pertaining to the license file 90 in a predetermined storage area and makes the license file 90 into an available (usable) state.

Then, the activation part 119 queries the result of acquiring (setting) the license of the sales package to the current device (Step S111-17). The query (polling) is repeated until the recording of the license file 90 into the predetermined storage area is completed and the license acquiring result is returned (transmitted) to the activation part 119.

Then, the activation part 119 stores the current process status by updating the process status storing part 124 (Step S111-18). More specifically, in a case where the acquiring of the license has succeeded, the activation part 119 updates the value of the record "process status" corresponding to the current device in the device management table to a value indicating the completion of acquiring (setting) the license (activation complete). In this case, the license archive file associated with the current device may be deleted.

On the other hand, in a case where the acquiring (setting) of the license has failed, the value of the record "process status" corresponding to the current device in the device management table is not updated. Further, the license archive file associated with the current device is not deleted.

When execution of the Step S111 (S111-1 to S111-18) is completed for all of the image forming apparatuses 20 selected in Step S107, the re-execution control part 123 performs a re-execution process based on the process status storage part 124 (Step S111-19).

Figure 19:
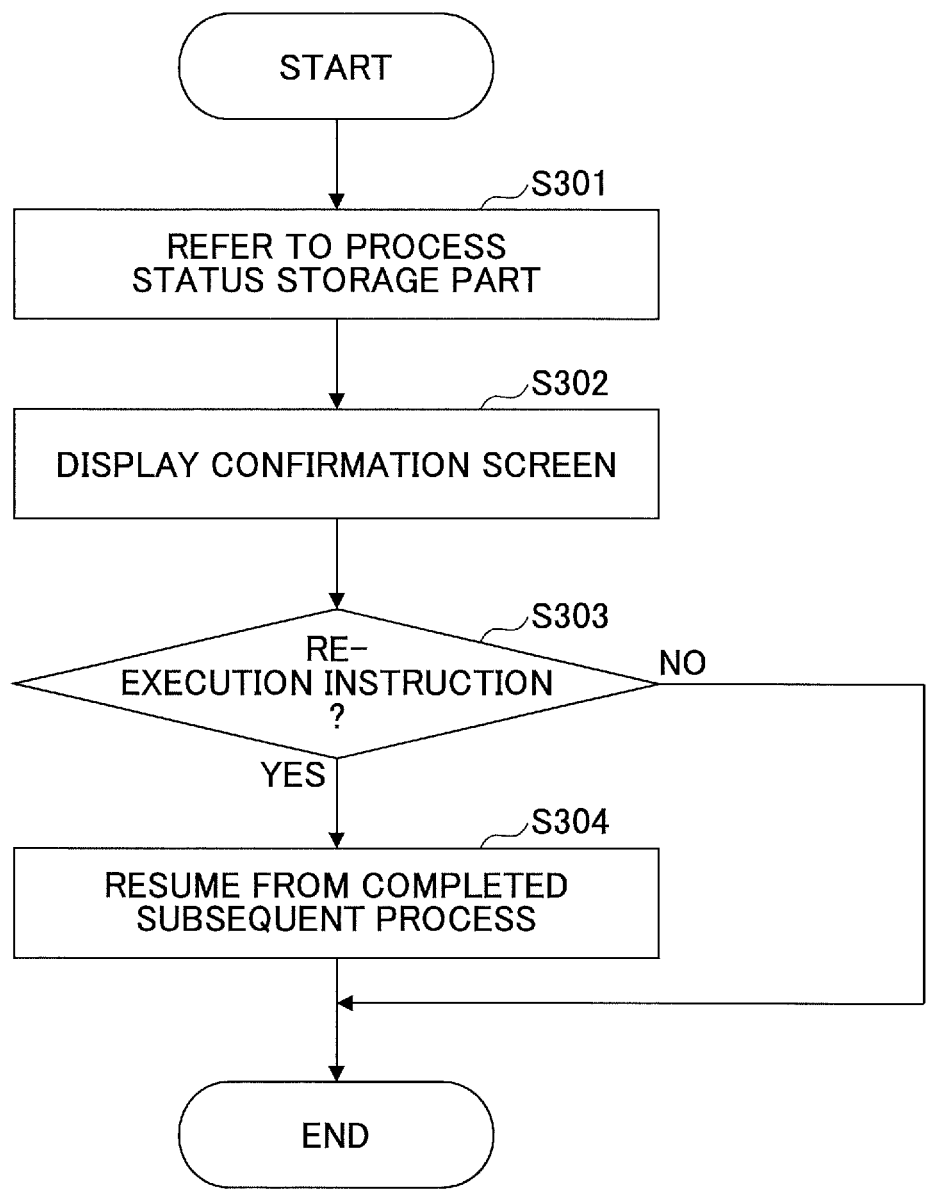
FIG. 19 is a flowchart for explaining steps of a re-execution process according to an embodiment of the present invention.

Next, the re-execution process by the re-execution control part 123 in Step S111-19 is described in more detail. FIG. 19 is a flowchart for explaining the steps of the re-execution process according to an embodiment of the present invention.

The re-execution control part 123 refers to the process status storage part 124 (Step S301). Then, the re-execution control part 123 instructs the display device 106 to display a confirmation screen based on the device management table (Step S302). The contents of the device management table are displayed on the confirmation screen. Accordingly, the user can confirm the image forming apparatus which has not acquired a license by referring to the process status. Incompletion of acquiring a license signifies that the value of the process status indicates a case other than "license acquiring complete" (in other words, a case where an error occurs in the middle of a process of acquiring a license). In order to enhance visibility of records of image forming apparatuses which have not acquired a license, an additional column may be added to the confirmation screen for indicating generation of an error or a corresponding record may be indicated with a distinguishing color such as red. Considering a case where installation is to be performed on a significant number of image forming apparatuses 20 at a single time, the value of the process status may be displayed only for image forming apparatuses 20 which have not completed the acquiring of a license. Alternatively, a message may be displayed for indicating the generation of an error in the middle of acquiring a license with respect to a part of or all of the image forming apparatuses 20. In any case, when there is an image forming apparatus 20 whose process status indicates a value other than "license acquiring complete", a display component (e.g., button) for receiving input of an instruction to perform re-execution is displayed on the confirmation screen.

Thus, the user can confirm the process status of each image forming apparatus 20 on the confirmation screen and investigate the cause of error. For example, the user can confirm the status of the network or the status of the image forming apparatus 20. After the cause of error is identified and eliminated, the user can input an instruction to perform the re-execution process (re-execution instruction) via the confirmation screen. It is, however, possible to input re-execution even in a case where the cause of error cannot be identified.

In a case where the re-execution instruction is input via the confirmation screen (Yes in Step S303), the re-execution control part 123 determines that the image forming apparatuses 20, which have a process status other than "license acquiring complete", are process targets (current devices) and sequentially perform the re-execution process on the process targets (current devices) according to the process status of the current devices (Step S304). More specifically, in a case where the process status of a current device is "device data obtaining complete", the re-execution control part 123 requests re-execution of processes pertaining to the current device to the validity confirmation part 115. As a result, the current device performs the step on and after Step S111-1. In a case where the process status of the current device is "validity inspection complete", the re-execution control part 123 requests re-execution of processes pertaining to the current device to the package obtaining part 116. As a result, the current device performs the step on and after Step S111-4. In a case where the process status of the current device is "package obtaining complete", the re-execution control part 123 requests re-execution of processes pertaining to the current device to the license obtaining part 116. As a result, the current device performs the step on and after Step S111-7.

In a case where the process status of the current device is "license obtaining complete", the re-execution control part 123 requests re-execution of processes pertaining to the current device to the install control part 118. As a result, the current device performs the steps on and after Step S111-10 or Step S111-13. In a case where the process status of the current device is "unresolved package install complete", the re-execution control part 123 requests re-execution of processes pertaining to the current device to the install control part 118. As a result, the current device performs the step on and after Step S111-13. In a case where the process status of the current device is "sales package install complete", the re-execution control part 123 requests re-execution of processes pertaining to the current device to the activation part 119. As a result, the current device performs the step on and after Step S111-16.

Each part requested to perform re-execution of processes by the re-execution control part 123 can perform the processes based on data recorded in the process status storage part 124 in association with the current device. This is because the data required for performing the re-execution according to process status are recorded in the process status storage part 124. Accordingly, in a case where an error occurs in an image forming apparatus 20 during operation, the possibility of completing the acquiring of a license can be increased. As a result, the possibility of resolving inconsistency between the status of the license management table 52 of the license management server 50 and the status of license acquirement by an image forming apparatus 20 can be increased. That is, in a case of a license indicated as "checked out" in the license management table 52, the possibility of the license file 90 being not acquired by the image forming apparatus 20 can be reduced.

With respect to all image forming apparatuses 20 having a process status other than "license acquiring complete", the re-execution process does not need to be performed automatically. For example, the user may be allowed to select from the confirmation screen, the image forming apparatus 20 to which the re-execution process is to be performed.

Further, the process by the re-execution control part 123 (i.e. the process illustrated in FIG. 19) does not need to be executed as a part of the process illustrated in FIG. 7. For example, after completion of the process of FIG. 7, the process of FIG. 19 could be performed at another opportunity. In that case, the user is to select or designate the process status storage part (process target) 124 that is to be processed. Accordingly, it is preferable to assign identification data (e.g., file name) to the process status storage part 124 (e.g., archive file) for enabling the user to easily determine when the installing process was performed.

Next, a process performed by the license management part 51 of the license management server 59 in response to a license use request (see Step S111-7 of FIG. 7) is described in detail.

Figure 20:
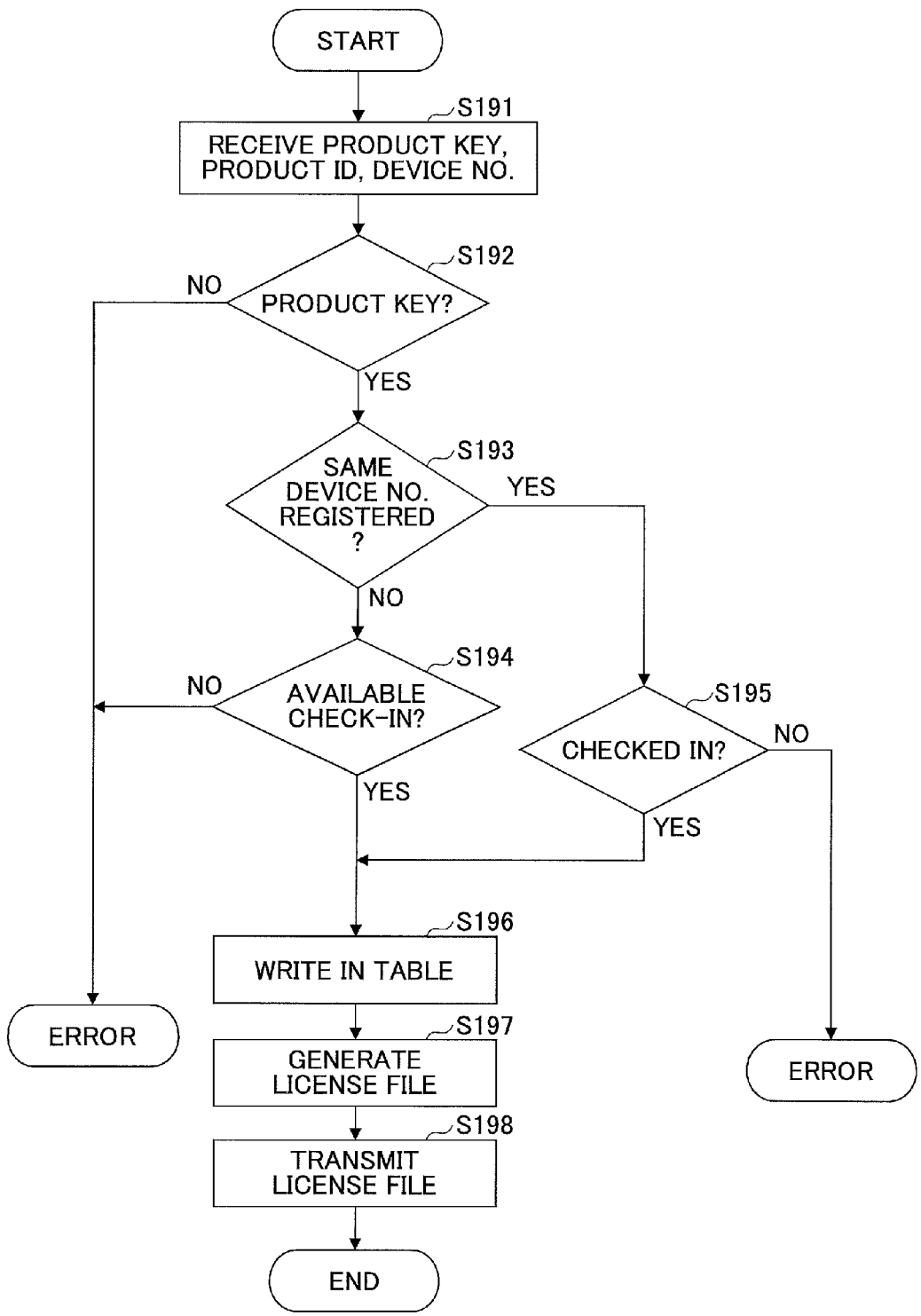
FIG. 20 is a flowchart illustrating steps of a license file generating process with a license management part according to an embodiment of the present invention.

FIG. 20 is a flowchart illustrating steps of a license file generating process with the license management part 51 according to an embodiment of the present invention. In FIG. 20, a single product key is the target of the license file generating process (process target). Accordingly, in a case where plural product keys are received, the steps in and after Step S192 are performed one product key at a time.

In Step S191 (see Step S111-7 of FIG. 7), the license management part 51 receives a license use request (request to use a license) including a product key, a product ID, and a device number at the license obtaining part 117. Then, the license management part 51 determines whether the license corresponding to the product key could be used. More specifically, the license management part 51 confirms whether the received product key is registered in the license management table 52 (Step S192). In a case where the product key is registered (Yes in Step S192), the license management part 51 confirms whether the same device number as the received device number is registered in correspondence with the product key in the license management table 52 (Step S193). In a case where the product key is not registered (No in Step S193), the license management part 51 confirms whether there is a record among the records of the product key and the product ID having a status "checked in" in the license management table 52 (Step S194). In a case where there is a corresponding record (Yes in S194), the license management part 51 records (write) the received device number corresponding to the record and sets the status of the record to "checked out" (Step 196). That is, it is recorded that a license corresponding to the received product key is being used. Further, in a case where a license validity period is recorded in the record (that is, the record is a record corresponding to a time limited license), the license management part 51 records the time/date obtained by adding the current time/date to the license validity period to the corresponding record.

Then, the license management part 51 generates a license file 90 (see FIG. 17) including a product ID, a device number, and a validity data of the corresponding record (Step S197). It is to be noted that the license file 90 is generated for each record of the license management table 52. That is, the license file 90 is generated for each license of the sales package. Then, the license management part 51 transmits the generated license file 90 to the license obtaining part 117 of the device management apparatus 10 (Step S198).

On the other hand, in a case where there is a record of a product key having the same device number as the received device number (Yes in Step S193), the license management part 51 confirms whether the status of the record is "checked in" (Step S195). In a case where the status of the record is "checked in" (Yes in Step S195), the steps on and after Step S196 are performed.

In a case where there is no record of a corresponding product key in the license management table 52 (No in Step S192), a case where there is no record of the corresponding product key or the received product ID having a status "checked in" in the license management table 52 (No in Step S194), or a case where a record of a product key having the same device number as the received device number does not have a status "checked-in" (No in Step S195), the license management part 51 determines that an error is detected and does not generate the license file 90 (i.e. does not issue a license).

In the image forming apparatus 20, the license file 90 is used for a license check performed by a license check part 22. The license check is executed when activating the function package included in the installed sales package. That is, the license check part 22 permits the activation of the function package (activation target) i) in a case where there is a license file 90 corresponding to the sales package to which the function package (activation target) belongs, ii) in a case where the device number of the license file 90 matches the device number of the image forming apparatus 20 which is to activate the function package (activation target), or iii) in a case where the validity date of the license file 90 is not expired.

Next, processes for uninstalling and deactivating (release of license) of the sales package are described.

FIG. 21 is a sequence diagram for describing uninstalling and deactivating the sales package according to an embodiment of the present invention.

In Step S201, the UI control part 111 of the device management apparatus 10 receives user's input of a product key of an uninstall target via an uninstall screen displayed by the display device 106. Then, the package data obtaining part 112 designates the input product key and transmits a request for obtaining package data corresponding to the designated product key to the license management server 50 (Step S202).

Then, the license management part 51 of the license management server 50 transmits (returns) data recorded in the record corresponding to the received product key (record of license management table 52) to the package data obtaining part 112 (Step S203). In a case where the product key is for a group license, package data pertaining to plural sales packages are transmitted (returned).

When the package data obtaining part receives the package data, the package data obtaining part 112 generates the process status storage part 124 in the auxiliary storage device 102 and stores the current process status in the process status storage part 124 (Step S204). More specifically, the package data obtaining part records the product key, and the package data in the process status storage part 124. As a result, the contents of the process status storage part are stored in the manner illustrated in FIG. 10.

In a case where the product key is for a group license, that is, in a case where package data pertaining to plural sales packages are received, the UI control part 111 instructs the display device 103 to display the sales package selection screen including a list of sales packages for allowing the user to select the sales package (uninstall target) (Step S205). In this example, the selected sales package is hereinafter also referred to as "current sales package".

Then, the device data obtaining part 113 transmits a request for obtaining device data (device data obtaining request) for each image forming apparatus 20 (Step S206). The request process part 21 of each image forming apparatus 20 obtains data recorded in the install data management table 23 in accordance with the device data obtaining request and transmits device data including the obtained data together with data of the device number of the image forming apparatus 20 to the device data obtaining part 113 (Step S207).

Data (e.g., IP address, host address) of the image forming apparatus 20 subject to the device data obtaining process are stored in the auxiliary storage device 102 beforehand. Alternatively, the device data obtaining part 113 may dynamically search the image forming apparatuses 20 connected to a network and obtain device data from the searched image forming apparatuses 20.

Then, the uninstall destination determining part 120 matches the package data obtained in Step S203 and the device data obtained from each image forming apparatus in Step S207 and determines the image forming apparatus 20 having the sales package of the package data installed therein (Step S208). More specifically, the image forming apparatus 20, which includes device data including the product ID contained in the package ID (product ID of sales package), is determined as the image forming apparatus 20 to which the sales package is installed (i.e. image forming apparatus 20 at which the sales package is to be installed (uninstall destination)).

Then, the uninstall destination determination part 120 stores the current process status by updating the process status storage part 124 (Step S209). More specifically, the uninstall destination determination part 120 records (generates) the device management table (including the device number and the device data of each image forming apparatus 20 at which the sales package is to be uninstalled, uninstall destination) in the process status storage part 124. As a result, the contents are stored in the process status storage part 124 are illustrated in FIG. 12.

Then, Step S210 is a loop process that is executed for each image forming apparatus 20 (uninstall destination) from which sales packages data are uninstalled. The image forming apparatuses 20 subjected to the loop process are hereinafter referred to as "current devices".

In Step S210-1, the deactivation part 121 designates the product ID of the current sales package and transmits a request for deactivation (request for deleting the license file 90) to the current device. The request process part 21 of the current device deletes the license file 90 corresponding to the designated product ID in accordance with the request.

Then, the deactivation part 121 queries the result of the process of deleting the license file 90 to the current device (Step S210-2). The query (polling) is repeated until deleting of the license file 90 by the current device is completed and the deletion result is returned (transmitted) to the deactivation part 121.

Then, the deactivation part 121 stores the current process status by updating the process status storing part 124 (Step S210-3). More specifically, in a case where the deletion of the license file 90 has succeeded, the deactivation part 121 updates the value of the record "process status" corresponding to the current device in the device management table to a value indicating the completion of deleting the license file 90 (license deletion complete). On the other hand, in a case where the deleting of the license file 90 has failed, the value of the record "process status" corresponding to the current device in the device management table is not updated and the below-described steps (processes) are not performed for the current device. Accordingly, the steps of Step S210-1 and after are performed for the next image forming apparatus 20.

Then, the uninstall control part 122 designates the product ID of the current sales package and transmits a request for uninstalling (sales package deletion request) to the current device (Step S210-4). The request process part 21 of the current device uninstalls (deletes) the sales package corresponding to the designated product ID in accordance with the request.

Then, the uninstall control part 122 queries the result of the process of uninstalling the sales package to the current device (Step S210-5). The query (polling) is repeated until uninstalling of the sales package by the current device is completed and the uninstalling result is returned (transmitted) to the uninstall control part 122.

Then, the uninstall control part 122 stores the current process status by updating the process status storing part 124 (Step S211). More specifically, in a case where the uninstalling of the current sales package has succeeded, the uninstall control part 122 updates the value of the record "process status" corresponding to the current device in the device management table to a value indicating the completion of uninstalling the current sales package (uninstall complete). On the other hand, in a case where the uninstalling of the sales package has failed, the value of the record "process status" corresponding to the current device in the device management table is not updated and the below-described steps (processes) are not performed for the current device. Accordingly, the steps of Step S210-1 and after are performed for the next image forming apparatus 20.

After the processes of Step S210 are performed on all of the image forming apparatuses 20 subjected to the uninstalling of the sales packages, the deactivation part 121 designates the product ID of the current sales package and the device numbers of all image forming apparatuses 20 and transmits a request for deactivation (request for releasing a license) to the license management part 51 of the license management server (Step S212). The license management part 51 changes the status of the record corresponding to the designated product ID and the device number from "check out" to "check in". In other words, data indicating that the license is not being used is recorded in the license management table 52. It is to be noted that the deactivation process can be performed on a license having a status "check out". Therefore, in a case where the status of a target record is not "check out", the license management part 51 determines the deactivation process has failed.

Then, the license management part 51 transmits the results of the deactivation process (success/failure of the deactivation process) to the deactivation part 121 of the image forming apparatus 20 (Step S213).

Then, the deactivation part 121 stores the current process status by updating the process status storage part 124 (Step S214). More specifically, in a case where the deactivation process has succeeded, the deactivation part 121 updates the value of the record "process status" corresponding to the current device in the device management table to a value indicating the completion of the deactivation process (deactivation complete). On the other hand, in a case where the deactivation process has failed, the value of the record "process status" corresponding to the current device in the device management table is not updated.

After the processes of Step S210 are performed on all of the image forming apparatuses 20 subject to the uninstalling process, the re-execution control part 123 executes the re-execution process based on the process status storage part 124 (Step S215). The re-execution process is described above with reference to FIG. 19. Since the details of the re-execution process for the uninstalling process is apparent from the above-described re-execution process for the installing process, detailed explanation of the re-execution process for the uninstalling process is omitted.

Owing to the re-execution process, even in a case where an error occurs during the first time of performing the deactivation process on an image forming apparatus 20, the possibility of completing the deactivation process can be increased. As a result, the possibility of resolving inconsistency between the status of the license management table 52 of the license management server 50 and the status of license acquisition by an image forming apparatus 20 can be increased. That is, in a case of a license indicated as "checked in" in the license management table 52, the possibility of the license file 90 being not deleted from the image forming apparatus 20 can be reduced.

By executing the processes of FIG. 21, the function package included in the sales package cannot be used for the image forming apparatus 20 subjected to the uninstalling process. On the other hand, because the license of the sales package is released, the license can be used for other image forming apparatuses as long as the validity date of the license has not lapsed. In other words, the deactivation process is particularly useful in a case where the license of the sales package of one image forming apparatus 20 is desired to be moved to another image forming apparatus 20 due to, for example, the lapse of a leasing period of the image forming apparatus 20.

It is to be noted that, with the device management system 1 according to the above-described embodiment of the present invention, installing of a sales package corresponding to a product key and acquiring a license file 90 can be automatically executed for an image forming apparatus 20 by inputting the product key corresponding to the image forming apparatus 20. As a result, not only customer engineers of the image forming apparatus 20 but also end-users can establish an execution environment of the sales package (program component).

With the device management apparatus 10 according to the above-described embodiment of the present invention, installation and activation (beginning the use of a license) can be performed for plural image forming apparatuses 20 in a batch. From this aspect, the user workload can be reduced.

Although an image forming apparatus 20 is used as an example of an electronic device for describing embodiments of the present invention, apparatuses and devices other than the image forming apparatus 20 may be used. An embodiment of the present invention can be effectively applied to an electronic device capable of adding (installing) a program thereto.

Hence, with the above-described embodiment of the present invention, appropriate recovery can be realized even in a case where a failure occurs in a middle of a process of acquiring a license of a program.

The present invention is not limited to the specifically disclosed embodiments, and variations and modifications may be made without departing from the scope of the present invention.

What is claimed is:

1. A data processing system including at least one computer, the data processing system comprising:
    a license management part configured to store license identification data and license status data in association with the license identification data;
    a request receiving part configured to receive a request to acquire a license corresponding to a designated license identification data and a request to release the license;
    a designation receiving part configured to receive a designation of an electronic device for acquiring the license;
    an obtaining part configured to designate the license identification data, obtain license data corresponding to the designated license identification data from the license management part, and update the license status data associated with the designated license identification data, the updated license status data indicating whether the license is being used;
    an acquirement control part configured to transmit the obtained license data to the electronic device via a network and instruct the electronic device to acquire the license;
    a license release part configured to transmit the request to release the license, so that the license status data is updated to indicate that the license is not being used;
    a deletion control part configured to execute a deletion operation including transmitting a request to delete the license data to the electronic device, instructing the electronic device to delete the license data, and recording a deletion result in association with the electronic device; and
    a re-execution part configured to provide a part that receives an instruction for re-executing a process of obtaining the license data depending on whether the license status data is updated and instruct the obtaining part to re-execute the process of obtaining the license data, and further execute a deletion re-execution operation depending on whether the license status data is updated according to the deletion result, the deletion re-execution operation including displaying the update of the deletion on the screen and re-executing the deletion operation with respect to the license data based on data input to the screen.

2. The data processing system as claimed in claim 1, wherein the designation receiving part is configured to receive designations of a plurality of electronic devices, and wherein the re-execution part is configured to instruct the acquirement control part to re-execute a process of transmitting the license data depending on whether the license status data is updated.

3. The data processing system as claimed in claim 1,
    wherein the license identification data, a product identification data of a program, and the license status data are stored in association with each other in the license management part,
    wherein the device management part is further connected to a program management part for storing the product identification data in association with the program,
    wherein the device management part further comprises:
    a product data obtaining part configured to obtain the product identification data associated with the designated license identification data;
    a program obtaining part configured to obtain the program license data corresponding to the designated license identification data from the license management part and record the obtained program in association with the electronic device; and
    an install control part configured to execute an installation operation including the processes of transmitting the obtained program to the electronic device, instructing the electronic device to install the program, and recording a program installation result in association with the electronic device; and
    wherein the re-execution part is further configured to execute an installation re-execution operation depending on whether the license status data is updated according to the program installation result, the installation re-execution process including the processes of displaying the failure of the installation on the screen and re-executing the installation operation with respect to the license data based on data input to the screen.

4. A method for supporting acquirement of a license of a program, the method comprising the steps of:
   a) storing, with a license management part, license identification data and license status data in association with the license identification data;
   b) receiving, with a request receiving part, a request to acquire a license corresponding to a designated license identification data;
   receiving, with the request receiving part, a request to release the license;
   c) receiving, with a designation receiving part, a designation of an electronic device for acquiring the license;
   d) designating, with an obtaining part, the license identification data;
   e) obtaining, with the obtaining part, license data corresponding to the designated license identification data from the license management part;
   f) updating, with the obtaining part, the license status data associated with the designated license identification data, the updated license status data indicating whether the license is being used;
   g) transmitting, with an acquirement control part, the obtained license data to the electronic device via a network;
   h) instructing, with the acquirement control part, the electronic device to acquire the license;
   transmitting, with a license release part, the request to release the license, so that the license status data is updated to indicate that the license is not being used;
   executing, with a deletion control part, a deletion operation including transmitting a request to delete the license data to the electronic device, instructing the electronic device to delete the license data, and recording a deletion result in association with the electronic device;
   i) providing, with a re-execution part, a part that receives an instruction for re-executing a process of obtaining the license data depending on whether the license status data is updated;
   j) instructing, with the re-execution part, the obtaining part to re-execute the process of obtaining the license data; and
   executing, with the re-execution part, a deletion re-execution operation depending on whether the license status data is updated according to the deletion result, the deletion re-execution operation including displaying the update of the deletion on the screen and re-executing the deletion operation with respect to the license data based on data input to the screen.

5. The method as claimed in claim 4,
   wherein step c) includes receiving designations of a plurality of electronic devices, and
   wherein step j) includes instructing the acquirement control part to re-execute a process of transmitting the license data depending on whether the license status data is updated.

6. The method as claimed in claim 4,
   wherein the method further comprises the steps of:
   storing the license identification data, a product identification data of a program, and the license status data in association with each other in the license management part,
   storing the product identification data in association with the program in a program management part connected to the device management part,
   obtaining, with a product data obtaining part, the product identification data associated with the designated license identification data,
   obtaining, with a program obtaining part, the program license data corresponding to the designated license identification data from the license management part,
   recording, with the program obtaining part, the obtained program in association with the electronic device,
   executing, with an install control part configured, an installation operation including the processes of transmitting the obtained program to the electronic device,
   instructing, with the install control part, the electronic device to install the program,
   recording, with the install control part, a program installation result in association with the electronic device, and
   executing an installation re-execution operation depending on whether the license status data is updated according to the program installation result, the installation re-execution process including the processes of displaying the failure of the installation on the screen and re-executing the installation operation with respect to the license data based on data input to the screen.

7. A non-transitory computer-readable recording medium on which a computer program is recorded for causing a computer to execute a method for supporting acquirement of a license of a program, the method comprising the steps of:
   a) storing, with a license management part, license identification data and license status data in association with the license identification data;
   b) receiving, with a request receiving part, a request to acquire a license corresponding to a designated license identification data;
   receiving, with the request receiving part, a request to release the license;
   c) receiving, with a designation receiving part, a designation of an electronic device for acquiring the license;
   d) designating, with an obtaining part, the license identification data;
   e) obtaining, with the obtaining part, license data corresponding to the designated license identification data from the license management part;
   f) updating, with the obtaining part, the license status data associated with the designated license identification data, the updated license status data indicating whether the license is being used;
   g) transmitting, with an acquirement control part, the obtained license data to the electronic device via a network;
   h) instructing, with the acquirement control part, the electronic device to acquire the license;
   transmitting, with a license release part, the request to release the license, so that the license status data is updated to indicate that the license is not being used;
   executing, with a deletion control part, a deletion operation including transmitting a request to delete the license data to the electronic device, instructing the electronic device to delete the license data, and recording a deletion result in association with the electronic device;
   i) providing, with a re-execution part, a part that receives an instruction for re-executing a process of obtaining the license data depending on whether the license status data is updated;
   j) instructing, with the re-execution part, the obtaining part to re-execute the process of obtaining the license data; and
   executing, with the re-execution part, a deletion re-execution operation depending on whether the license status data is updated according to the deletion result, the deletion re-execution operation including displaying the update of the deletion on the screen and re-executing the deletion operation with respect to the license data based on data input to the screen.

8. The non-transitory computer-readable recording medium as claimed in claim 7,
wherein step c) includes receiving designations of a plurality of electronic devices, and
wherein step j) includes instructing the acquirement control part to re-execute a process of transmitting the license data depending on whether the license status data is updated.

9. The non-transitory computer-readable recording medium as claimed in claim 7,
wherein the method further comprises the steps of:
storing the license identification data, a product identification data of a program, and the license status data in association with each other in the license management part,
storing the product identification data in association with the program in a program management part connected to the device management part,
obtaining, with a product data obtaining part, the product identification data associated with the designated license identification data,
obtaining, with a program obtaining part, the program license data corresponding to the designated license identification data from the license management part,
recording, with the program obtaining part, the obtained program in association with the electronic device,
executing, with an install control part configured, an installation operation including the processes of transmitting the obtained program to the electronic device,
instructing, with the install control part, the electronic device to install the program,
recording, with the install control part, a program installation result in association with the electronic device, and
executing an installation re-execution operation depending on whether the license status data is updated according to the program installation result, the installation re-execution process including the processes of displaying the failure of the installation on the screen and re-executing the installation operation with respect to the license data based on data input to the screen.

* * * * *

UNITED STATES PATENT AND TRADEMARK OFFICE
CERTIFICATE OF CORRECTION

PATENT NO. : 9,027,161 B2
APPLICATION NO. : 14/183798
DATED : May 5, 2015
INVENTOR(S) : Yuuko Sugiura et al.

It is certified that error appears in the above-identified patent and that said Letters Patent is hereby corrected as shown below:

On the Title Page, Item (73):

Please correct the Item (73): Name of Assignee

Ricoh Company, Ltd, Tokyo (JP)

to

Ricoh Company, Ltd., Tokyo (JP)

Signed and Sealed this
Seventeenth Day of May, 2016

Michelle K. Lee
*Director of the United States Patent and Trademark Office*